(12) United States Patent
Takeuchi et al.

(10) Patent No.: US 6,917,178 B2
(45) Date of Patent: Jul. 12, 2005

(54) ELECTRIC ACTUATOR SYSTEM

(75) Inventors: Tokuhisa Takeuchi, Chita-gun (JP); Takashi Takata, Nagoya (JP); Nobukazu Kuribayashi, Kariya (JP); Masahiko Sugaya, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/735,005

(22) Filed: Dec. 12, 2003

(65) Prior Publication Data

US 2004/0124797 A1 Jul. 1, 2004

(30) Foreign Application Priority Data

Dec. 16, 2002 (JP) ........................................ 2002-363928
Sep. 1, 2003 (JP) ........................................ 2003-308675

(51) Int. Cl.[7] .............................................. H02K 24/00
(52) U.S. Cl. ........................ 318/625; 318/59; 318/431; 318/464
(58) Field of Search ............................ 318/625, 53, 54, 318/59, 62, 65, 66, 430, 431, 461, 463, 464

(56) References Cited

U.S. PATENT DOCUMENTS

| | | | |
|---|---|---|---|
| 4,899,809 A | * | 2/1990 | Takenaka et al. ........... 165/202 |
| 5,148,685 A | * | 9/1992 | Takano et al. ................ 62/229 |
| 5,939,853 A | * | 8/1999 | Masauji et al. ............. 318/685 |
| 6,501,239 B2 | * | 12/2002 | Ito et al. ........................ 318/34 |
| 6,747,432 B2 | * | 6/2004 | Yoshimura ................... 318/599 |
| 6,771,178 B2 | * | 8/2004 | Bruzy et al. ................. 340/648 |

FOREIGN PATENT DOCUMENTS

JP         2004-17683         1/2004

* cited by examiner

*Primary Examiner*—Bentsu Ro
(74) *Attorney, Agent, or Firm*—Harness, Dickey & Pierce, PLC

(57) ABSTRACT

In determining a starting point of a motor of an electric actuator during its initialization procedure, when a rotation angle sensor detects pulse signals in a certain initialization pattern, power supply to the motor is stopped by the control of a motor drive circuit. This electrical control of motor rotation enables the initialization procedure of the actuator to be carried out without using mechanical restriction means for locking purposes, and the influence of variations in the deflection amount of any stoppers is eliminated. The precision in determining the starting point in the initialization procedure is thus improved.

36 Claims, 23 Drawing Sheets

| PULSE STATE | | INITIALIZATION DIRECTION | | COUNTER-INITIALIZATION DIRECTION | |
|---|---|---|---|---|---|
| A | B | CURRENT POSITION (PULSE NUMBER) | TARGET POSITION (PULSE NUMBER) | CURRENT POSITION (PULSE NUMBER) | TARGET POSITION (PULSE NUMBER) |
| 0 | 0 | FCh | 00h | 00h | FFh |
| 0 | 1 | FDh | 00h | 01h | FFh |
| 1 | 1 | FEh | 00h | 02h | FFh |
| 1 | 0 | FFh | 00h | 03h | FFh |

| DOOR | FAIL-SAFE POSITION |
|---|---|
| AIR MIX | HOT SIDE |
| BLOWING OPENING | DEF SIDE |
| AIR INLET | OUTSIDE AIR |
| COOLING AIR BYPASS | CLOSED |

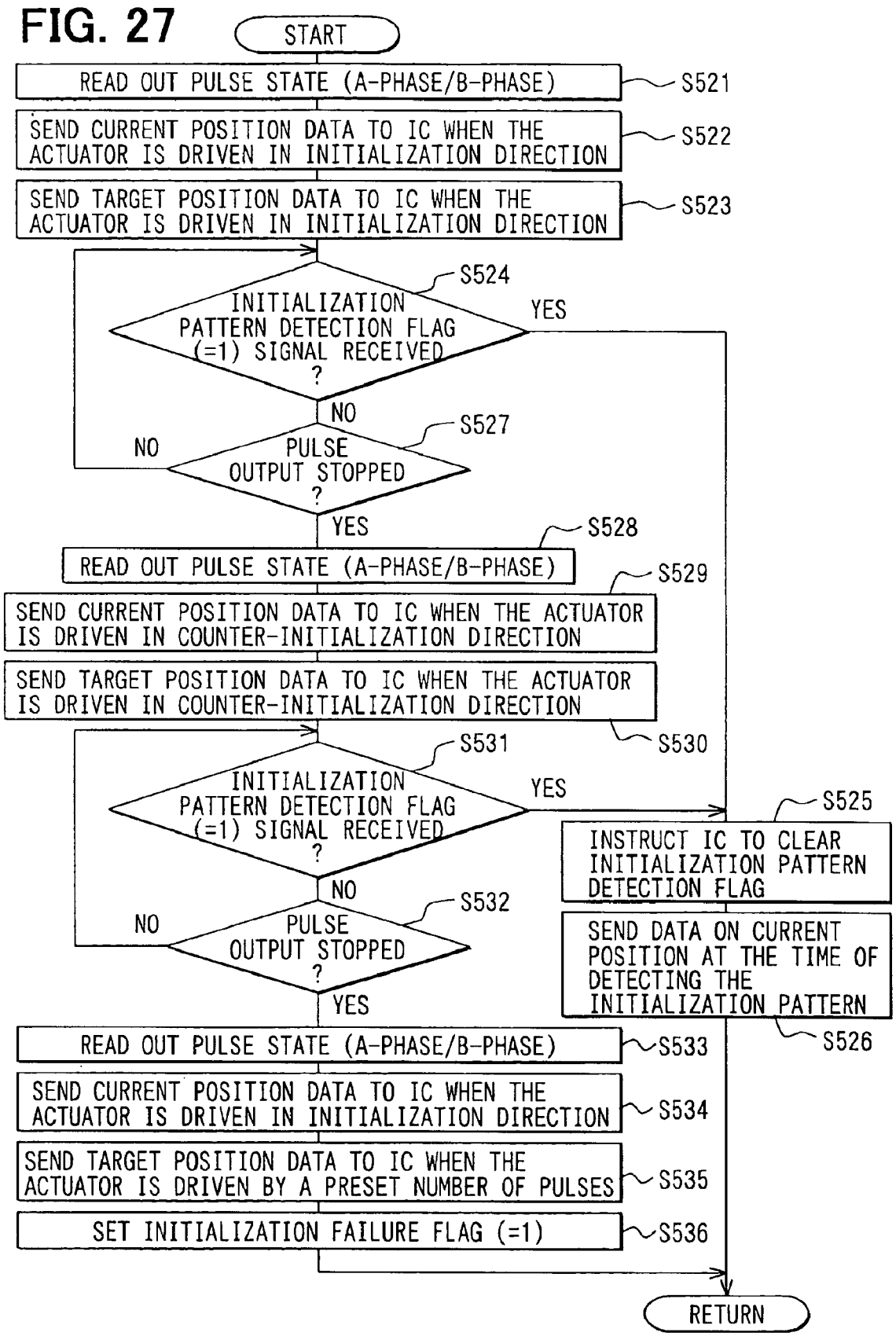

ELECTRIC ACTUATOR SYSTEM

CROSS REFERENCE TO RELATED APPLICATIONS

This application is based upon, claims the benefit of priority of, and incorporates by reference Japanese Patent Applications No. 2002-363928 filed Dec. 16, 2002, and No. 2003-308675 filed Sep. 1, 2003.

BACKGROUND OF THE INVENTION

1. Field of the Invention

The present invention relates to an electric actuator system for driving a movable member, such as an air mix door or a mode switch door, in a vehicle air conditioning system.

2. Description of the Related Art

Generally, electric actuators, when activated, move to a preset operation limit defined by mechanical restriction means such as a stopper so that the operation angle of the actuator is controlled relative to this limit as a starting point. Moving the actuator to a starting point and storing the position of the starting point will be hereinafter termed generally as "initialization." One problem in such an initialization procedure occurs when the actuator moves to the limit position by moving a rotatable lever of the actuator until it hits a stopper. Such an impact sometimes causes deflection in the stopper, which leads to variations in the recognized starting point.

The applicants of the present invention have shown, in a previously filed application (Japanese Patent Application No. 2002-171563), an arrangement in which the lever strikes a plurality of stoppers provided in a unit case to disperse the striking impact. While this structure reduces the variations in the starting point position, there is still the problem of deflection in the stoppers.

It was discovered that because each unit case in which the stoppers are mounted has a different rigidity, which causes variations in the amount of deflection in the stoppers, correction of the operation angle of the actuator using an electronic control unit based on a previously measured amount of deflection of each stopper became necessary. In such control, the correction value for the operation angle would have to be different for each case because of variations in the amount of deflection in each of the stoppers themselves. That is to say, one common control unit could not be used for the control of several actuators.

Another problem occurs if the actuator is left for some time in a locked condition such as when the battery for supplying power to the actuator is dismounted by chance when the actuator has been locked by the mechanical restriction means during initialization. There is the possibility that the gear strength, stoppers and the like built in the actuator may deteriorate because of creep.

Meanwhile, in recent years, more and more vehicles have a control system that stops the supply of power from the battery to the vehicle's electrical systems after a preset period of time has passed after the ignition switch is turned off. This is to suppress consumption of energy caused by dark current from the battery to electrical systems when the vehicle is stopped or parked, i.e., when the ignition switch is off.

While a memory device in the electric actuator system retains data on the starting point as long as it is powered, the data vanishes when the supply of power is stopped. The system thus carries out initialization again when it is started the next time.

This means that initialization is necessary almost every time the ignition switch is turned on, because even though the battery is not removed, the starting point data retained in the memory device disappears after the lapse of a preset time period following the turning off of the ignition switch. Additionally, the case in which the battery has been removed whereby power supply to the memory device is stopped must be considered. Such frequent operation of the actuator may result in wear of brushes in the pulse generator or electric motor, leading to shortened life of the actuator.

SUMMARY OF THE INVENTION

In view of the foregoing, an object of the present invention is to provide an electric actuator system that performs initialization without its operation being based on a locked position defined by a mechanical restriction means in order to improve precision in the recognized starting point. Another object of the invention is to provide an electric actuator system that performs initialization, without using mechanical restriction means, only when it is determined to be necessary, so as to reduce the number of times of carrying out initialization.

To achieve the above, according to a first aspect of the present invention, an electric actuator system has an electric motor (110), a pulse generator (153, 155 through 157) for generating pulse signals in accordance with rotation of the electric motor, and a rotation angle detecting means (220) for detecting a rotation angle of a rotating shaft based on the pulse signals generated by the pulse generator.

The pulse generator generates initialization pattern pulse signals as the electric motor rotates. These signals are indicative of a starting point of the rotation of the electric motor. The system includes a restriction means (S120) for electrically controlling the rotation of the electric motor when initialization pattern pulse signals are detected.

With this system, the initialization procedure can be carried out without using a mechanical restriction means for locking the motor, because the rotation of the motor is controlled electrically based on the detection of initialization pattern pulse signals. The motor position can be determined more precisely in the initialization procedure because it is carried out without any influence of variations in the deflection of, for example, stoppers.

According to a second aspect of the invention, the initialization pattern should have a combination of waveforms that are different from that of a signal pattern that the rotation angle detecting means uses for detecting the rotation angle. According to a third aspect of the invention, the pulse generator may have such a structure that it generates two-phase pulse signals. The initialization pattern includes, for example, a simultaneous change of amplitude of the two-phase pulse signals.

More specifically, according to a fourth aspect of the invention, the initialization pattern should preferably include more than two simultaneous changes of the amplitude of the two-phase signals so as to prevent erroneous judgment.

According to a fifth aspect of the invention, the pulse generator may have, for example, such a structure that it includes first and second switching means (158a, 158b) connected in parallel between a power source circuit and ground. The switching means are individually turned on and off as the electric motor rotates, thereby generating the two-phase pulse signals.

According to a sixth aspect of the invention, the pulse generator may further include a common switching means (158c) connected between the first and second switching means and ground. In this case, according to a seventh aspect of the invention, the pulse generator is configured such that the common switching means may be turned on and off while the first and second switching means are maintained in an ON state, so as to generate the two-phase pulse signals from the first and second switching means.

According to an eighth aspect of the invention, the initialization pattern may include a simultaneous change of the amplitude of the two-phase pulse signals from a low level to a high level, and to the low level.

According to a ninth aspect of the invention, an electric actuator system has an electric motor (110), a pulse generator (153, 155 through 157) for generating pulse signals in accordance with a rotation angle of the electric motor (110), and a rotation angle detecting means (220) for detecting a rotation angle of a rotating shaft based on the pulse signals generated by the pulse generator. The pulse generator generates initialization pattern pulse signals as the electric motor rotates. The signals are indicative of a starting point of the rotation of the electric motor. The system includes an initial position setting means for storing a position at which the initialization pattern pulse signals are detected as a starting point, and an initial position re-setting means for operating the initial position setting means when there is an abnormality in the pulse signals generated in accordance with the rotation angle of the electric motor (110). With this system, the initial position setting is carried out only when there has been an abnormality in pulse signals, which is when the initial position setting is highly necessary, so that the number of times of performing the setting is greatly reduced, thus avoiding an increase in the production cost.

According to a tenth aspect of the invention, the initial position re-setting means determines that there is an abnormality in the pulse signals when, for example, there is irregularity in the waveform of the pulse signals. Alternatively, according to an eleventh aspect of the invention, the initial position re-setting means determines that there is an abnormality in the pulse signals when the pulse signals have stopped changing while power is being supplied to the electric motor (110).

According to a twelfth aspect of the invention, the initial position re-setting means determines whether there is an abnormality in the pulse signals after a lapse of a preset time period after the start of supplying power to the motor. Thereby, an erroneous judgment as to whether there is an abnormality is prevented.

According to a thirteenth aspect of the invention, the initial position re-setting means operates the initial position setting means after supplying power to the motor to rotate the electric motor (110) in an opposite direction from a direction in which the electric motor (110) was rotating immediately before the pulse signals stopped changing. Thereby, the electric actuator can be freed from a locked state that may have been caused by the entry of foreign matter or the like, and thereby improving the reliability and durability of the actuator.

Alternatively, according to a fourteenth aspect of the invention, the initial position re-setting means operates the initial position setting means after supplying power to the motor to rotate the electric motor (110) in an opposite direction from a direction toward the starting point.

When there is an abnormality in the pulse signals, according to a fifteenth aspect of the invention, the initial position re-setting means operates the initial position setting means after a lapse of a preset time period after a startup switch that allows power supply to the electric motor (110) has been turned off. Alternatively, when there is an abnormality in the pulse signals, according to a sixteenth aspect of the invention, the initial position re-setting means may operate the initial position setting means immediately after a startup switch that allows power supply to the electric motor (110) has been turned off.

Alternatively, when there is an abnormality in the pulse signals, according to a seventeenth aspect of the invention, the initial position re-setting means may operate the initial position setting means immediately after the occurrence of the abnormality.

According to an eighteenth aspect of the invention, an electric actuator system has an electric motor (110), a battery for supplying power to the electric motor (110), a pulse generator (153, 155 through 157) for generating pulse signals in accordance with a rotation angle of the electric motor, and a rotation angle detecting means (220) for detecting a rotation angle of a rotating shaft based on the pulse signals generated by the pulse generator. The pulse generator generates initialization pattern pulse signals as the electric motor rotates. These signals are indicative of a starting point of the rotation of the electric motor.

The system includes an initial position setting means for storing a position at which the initialization pattern pulse signals are detected as a starting point, a startup switch that allows power supply to the electric motor, a memory device (230) that can retain input information without power, and a battery data inputting means for inputting data in the memory device (230) after the startup permission switch has been turned off. The data indicates that the battery is connected. With this system, the number of times of carrying out unnecessary initial position setting is greatly reduced, thereby keeping low the production cost of the electric actuator.

According to a nineteenth aspect of the invention, the memory device (230) is an EEPROM that is rewritable with electrical processing. According to a twentieth aspect of the invention, the system may further include a data reset means for resetting the data input to the memory device (230) after turning on the startup switch. According to a twenty-first aspect of the invention, the initial position setting means is operated when the data is not present in the memory device (230) after the startup switch has been turned on.

According to a twenty-second aspect of the invention, an electric actuator system has an electric motor (110) for rotating movable parts (1a, 1b, 1c), a pulse generator (158) for generating pulse signals in accordance with rotation of the electric motor, and a control means for controlling the rotation angle of a rotating shaft based on the pulse signals generated by the pulse generator. The pulse generator generates initialization pattern pulse signals as the electric motor rotates within a rotation control range of the movable parts.

The signals are indicative of a starting point of the rotation of the electric motor. The system including an initial position setting means (S404 through S406) for stopping the electric motor when the initialization pattern pulse signals are detected and for storing the stopped position of the electric motor as a starting point. The control means keeps the electric motor rotating during its control of the rotation angle even when the initialization pattern pulse signals are detected. With this system, a situation in which the motor is stopped upon detection of the initialization pattern pulse signals during the normal control of the rotation angle of the rotating shaft is prevented.

According to a twenty-third aspect of the invention, the system further includes a setting means for setting flag data when it is determined to be necessary to store the starting point. When the flag data is set, if the initialization pattern pulse signals are detected, the initial position setting means stops the rotation of the electric motor and stores the stopped position of the electric motor as the starting point. When the flag data is cleared, the control means ignores the initialization pattern pulse signals and keeps the electric motor rotating.

According to a twenty-fourth aspect of the invention, the direction in which the electric motor is rotated by the initial position setting means should preferably be determined based on detection possibility of the initialization pattern pulse signals. Alternatively, according to a twenty-fifth aspect of the invention this initialization direction may be determined based on mechanical strength at both ends of the rotation control range.

Alternatively, according to a twenty-sixth aspect of the invention the initial position setting means may determine a current season and decide in which direction to move the electric motor based on the determined season. According to a twenty-seventh aspect of the invention, there is provided a vehicle air conditioning system that incorporates the electric actuator system according to the twenty-sixth aspect and should preferably include an inside air temperature sensor for detecting an inside air temperature, so that the initial position setting means determines the season based on a detected inside air temperature.

Alternatively, according to a twenty-eighth aspect of the invention, there is provided a vehicle air conditioning system in which is incorporated the electric actuator system according to the twenty-sixth aspect. This system may include an outside air temperature sensor for detecting an outside air temperature, so that the initial position setting means determines the season based on a detected outside air temperature.

Alternatively, according to a twenty-ninth aspect of the invention, the initial position setting means may include both the inside air and outside air sensors so as to determine the season based on both the inside air and outside air temperatures. According to a thirtieth aspect of the invention, an electric actuator system has an electric motor (110), a pulse generator (158) for generating pulse signals in accordance with rotation of the electric motor and initialization pattern pulse signals indicative of a starting point of the rotation of the electric motor. Additionally, the actuator system has a control means for controlling the rotation angle of a rotating shaft based on the pulse signals generated by the pulse generator, an initial position setting means (S404 through S406) for stopping the electric motor when the initialization pattern pulse signals are detected and for storing the stopped position of the electric motor as a starting point. Finally, the system has a fail-safe means for stopping rotation of the electric motor at a fail-safe position when it is determined that there has been a failure in detecting the initialization pattern pulse signals.

The initialization pattern pulse signals may be temporarily undetectable but may eventually be detected if the electric motor is turned in its reverse direction several times.

According to a thirty-first aspect of the invention, the fail-safe means has a reverse rotation means for turning the electric motor in a reverse direction when it determines, based on the pulse signals from the pulse generator, that the initialization pattern pulse signals have not been detected during the rotation of the electric motor by the initial position setting means. Additionally, when the rotation of the motor is reversed more than a preset number of times, the fail-safe means determines that there has been a failure in detecting the initialization pattern pulse signals.

According to a thirty-second aspect of the present invention, an electric actuator system has a plurality of electric actuators (100) each including an electric motor (110) for rotating movable parts (1a, 1b, 1c), and a pulse generator (158) for generating pulse signals in accordance with rotation of the electric motor and initialization pattern pulse signals indicative of a starting point of the rotation of the electric motor within a rotation control range of the movable parts. Additionally, the actuator system also has a plurality of electrical control circuits (200) each including a control means for controlling the rotation angle of a rotating shaft of each electric actuator based on the pulse signals generated by the pulse generator, and an initial position setting means (S404 through S406) for stopping the electric motor when the initialization pattern pulse signals are detected and for storing the stopped position of the electric motor as a starting point. Finally, the system has an electronic control device (500) that communicates with the plurality of electrical control circuits. The electronic control device sends flag data to the electrical control circuit of each of the electric actuators for instructing whether to operate the initial position setting means. When the electrical control circuit has received preset flag data from the electronic control device, the control means of the electrical control circuit keeps the electric motor rotating and continues the control of the rotation angle of the electric motor even if the initialization pattern pulse signals are detected. With this system, a situation in which the motor is stopped upon detection of the initialization pattern pulse signals during normal control of the rotation angle of the rotating shaft is prevented as in the twenty-second aspect.

According to a thirty-third aspect of the present invention, an electric actuator system has a plurality of electric actuators (100). Each actuator (100) has an electric motor (110) for rotating movable parts (1a, 1b, 1c), and a pulse generator (158) for generating pulse signals in accordance with rotation of the electric motor and initialization pattern pulse signals indicative of a starting point of the rotation of the electric motor within a rotation control range of the movable parts. Additionally, a plurality of electrical control circuits (200) each include a control means for controlling a rotation angle of a rotating shaft of each electric actuator based on the pulse signals generated by the pulse generator.

An initial position setting means (S404 through S406) is for stopping the electric motor when the initialization pattern pulse signals are detected and for storing the stopped position of the electric motor as a starting point. An electronic control device (500) that communicates with the plurality of electrical control circuits is used. The electronic control device sends current position data of each electric actuator to each electrical control circuit. Each of the plurality of electrical control circuits receives the current position data from the electronic control device and renews the received current position data based on the pulse signals generated from the pulse generator. Furthermore, electrical control circuits operate the initial position setting means to stop the rotation of the electric motor and to store the stopped position of the electric motor as the starting point only when the renewed current position data matches a predetermined value and the initialization pattern pulse signals are detected.

With this system, the electronic control device uses the current position of each electric actuator for instructing the actuator to store the stopped position of the motor as the starting point without using additional communication data.

According to a thirty-fourth aspect of the invention, each of the plurality of electric actuators has a first and second stop means (5a, 5b) for mechanically stopping the rotation of the electric motor at both ends of the rotation control range, a reverse rotation means for turning the electric motor in a reverse direction when the rotation of the electric motor is stopped by the first stop means before the detection of the initialization pattern pulse signals by the initial position setting means, and a receiving means. The receiving means is for stopping the electric motor, during the rotation of the electric motor in the reverse direction by the reverse rotation means, at a position farther than a position where the initialization pattern pulse signals are to be detected before the electric motor is stopped by the second stop means and for receiving current position data from the electronic control device at the stopped position. When the reverse rotation means rotates the electric motor in the reverse direction after the receiving means has received the current position data, if the renewed current position data matches a predetermined value and if the initialization pattern pulse signals are detected, the initial position setting means stops the rotation of the electric motor and stores the stopped position as the starting point.

With this system, each electric actuator stops the electric motor at a position beyond the position where the initializing pattern signals are to be detected before the electric motor is stopped by the second stop means. The actuator also receives current position data from the electronic control device, i.e., the motor is stopped before it is stopped by the second stop means before receiving the current position data.

According to a thirty-fifth aspect of the invention, an electric actuator system has a plurality of electric actuators (100). Each actuator (100) includes an electric motor (110) for rotating movable parts (1a, 1b, 1c), and a pulse generator (158) for generating pulse signals in accordance with rotation of the electric motor and initialization pattern pulse signals indicative of a starting point of the rotation of the electric motor within a rotation control range of the movable parts. A plurality of electrical control circuits (200) each include a control means for controlling the rotation angle of a rotating shaft of each electric actuator based on the pulse signals generated by the pulse generator, and an initial position setting means (S404 through S406) for stopping the electric motor when the initialization pattern pulse signals are detected and for storing the stopped position of the electric motor as a starting point.

Finally, an electronic control device (500) communicates with the plurality of electrical control circuits. When the electronic control device determines that there has been a failure in detecting the initialization pattern pulse signals in each electric actuator, it instructs the electrical control circuit of each electric actuator to stop the rotation of the electric motor so that the electric actuator stops at a fail-safe position. With this system, the electric motor can be stopped so that the actuator is located at the fail-safe position when it is determined that there has been a failure in detecting the initialization pattern pulse signals.

According to a thirty-sixth aspect of the invention, the electronic control device has a reverse rotation means for turning the electric motor of the electric actuator in a reverse direction. The reverse rotation means operates when it determines, based on the pulse signals from the pulse generator, that the initialization pattern pulse signals have not been detected during the rotation of the electric motor by the initial position setting means, and furthermore, when the rotation of the electric motor is reversed more than a preset number of times, the electronic control device determines that there has been a failure in detecting the initialization pattern pulse signals in the electric actuator. Thereby, even if there has been a temporary signal detection failure, the signals may be able to be detected after the motor is turned, in its reverse direction, up to the preset number of times.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 27 is a control flowchart of the electronic control unit according to the seventh embodiment;

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 1:
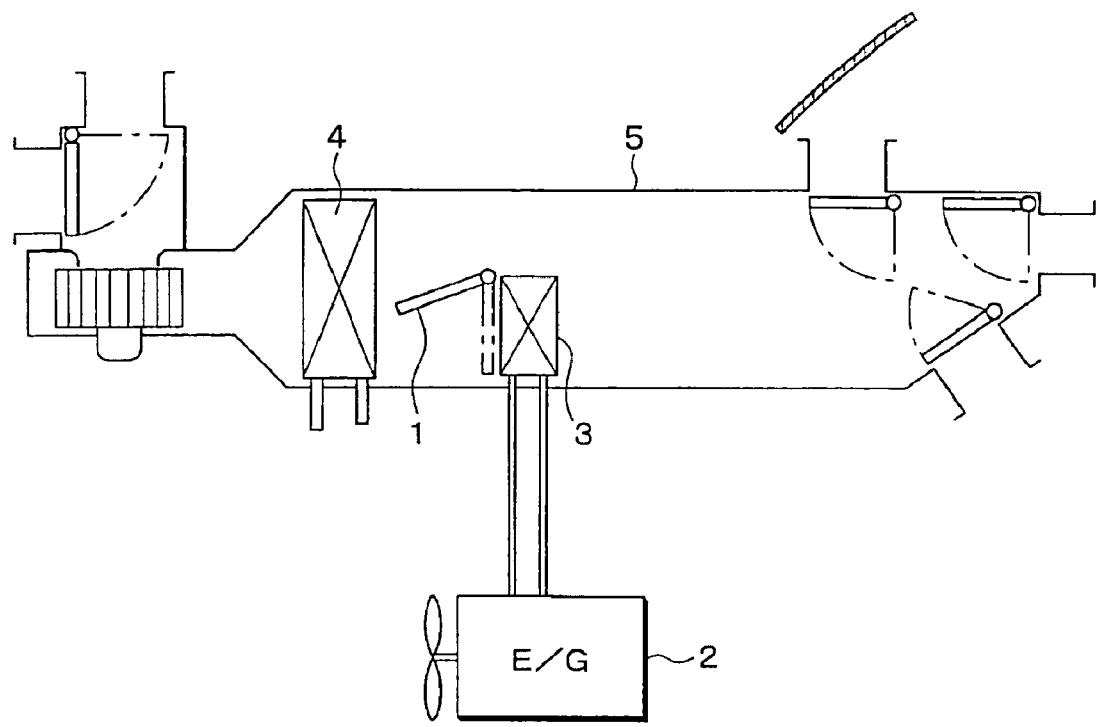
FIG. 1 is a diagram of a vehicle air conditioning system according to a first embodiment of the invention.

An electric actuator 100, hereinafter "actuator" according to the invention is applied as a drive device for an air mix door of a vehicle air conditioning system in the following embodiments. FIG. 1 shows the structure of a vehicle air conditioning system. The air mix door 1 adjusts the temperature of air blown into the vehicle compartment by adjusting the amount of air that bypasses a heater core 3, which heats the air using the cooling water from the engine 2 as a heat source. A heat exchanger including the heater core 3 and an evaporator 4, and the air mix door 1 are all accommodated in an air conditioning system casing 5, which can be made from resin, to which the actuator 100 is fixed by a fastening means such as a screw.

Figures 2A, 2B:
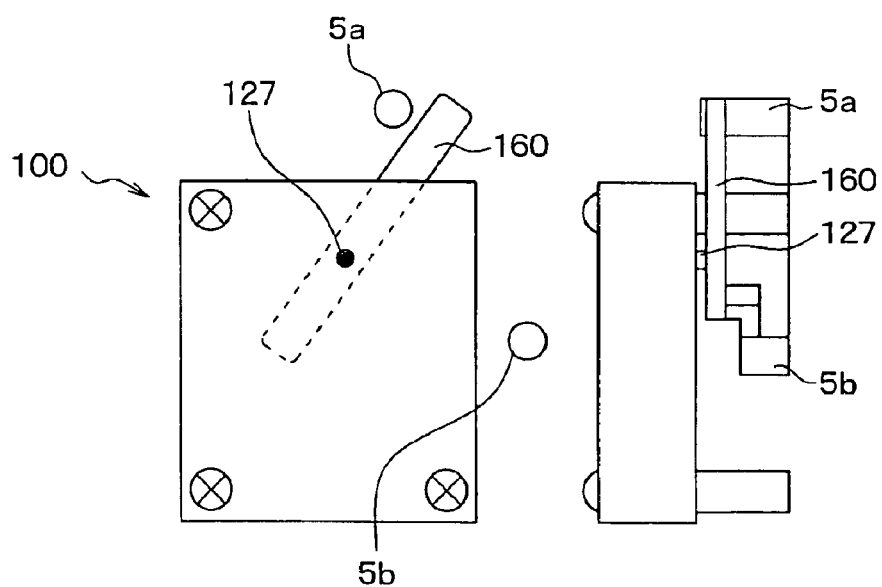
FIG. 2A is a view of an electric actuator according to the first embodiment.
FIG. 2B is a view of an electric actuator according to the first embodiment.
Figure 3:
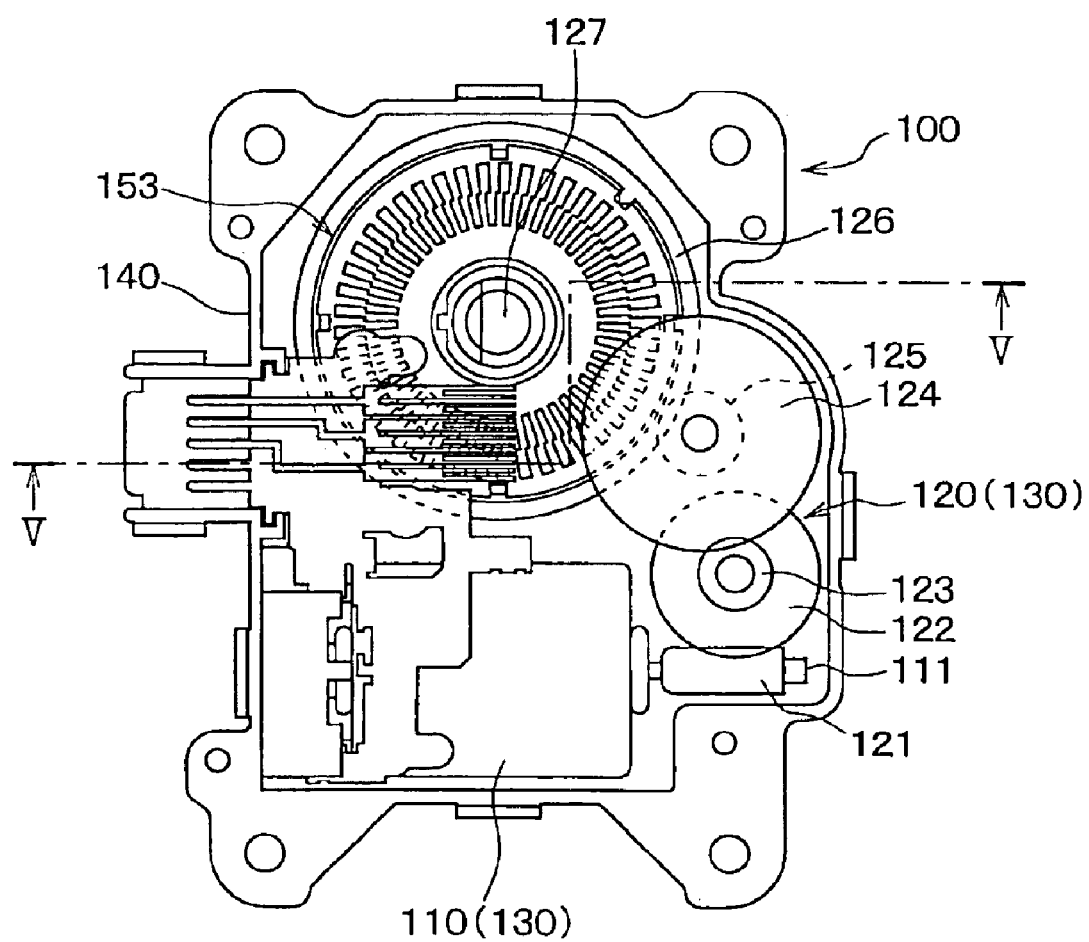
FIG. 3 is a view of the electric actuator according to the first embodiment.
Figure 4A:
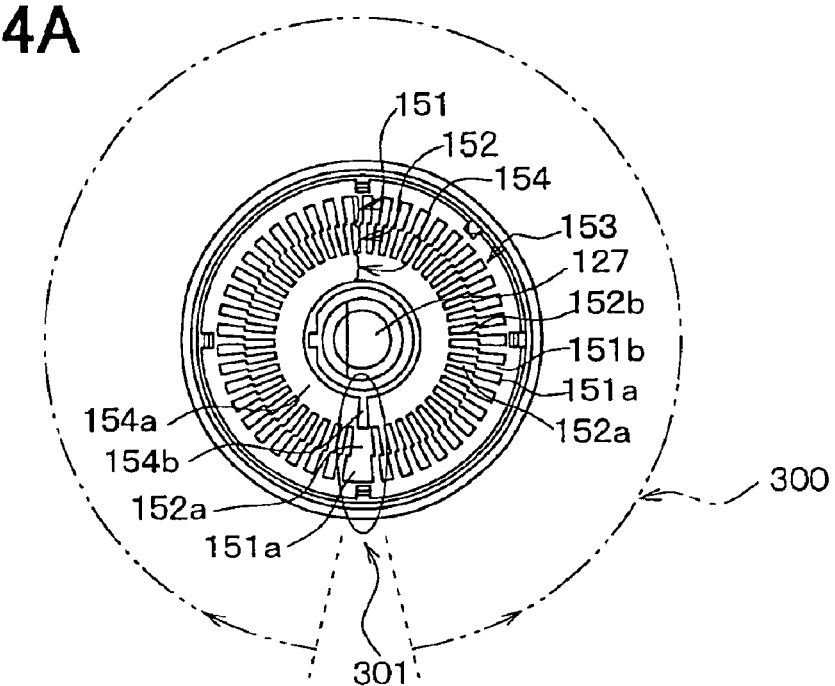
FIG. 4A is a front view of a pulse plate according to the first embodiment.
Figure 4B:
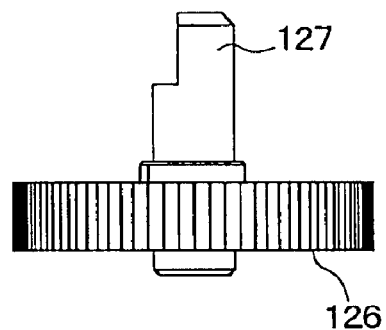
FIG. 4B is a side view of the pulse plate according to the first embodiment.
Figure 5:
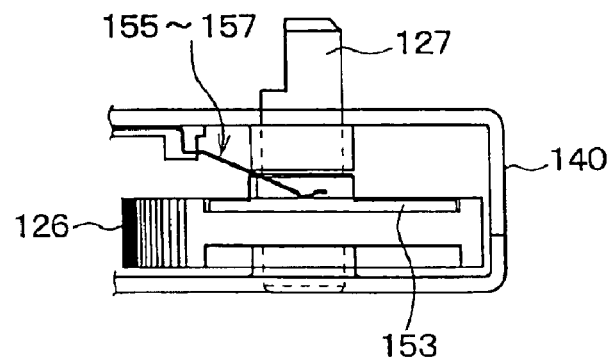
FIG. 5 is a cross-sectional view taken along the line V—V of FIG. 3.

FIGS. 2A and 2B shows the general appearance of the actuator 100, and FIG. 3 shows more detail with respect to its structure. Referring to FIG. 3, a DC motor 110 rotates by the power supplied from a battery (not shown) mounted in the vehicle, and a reduction mechanism 120 forms a transmission mechanism for transmitting the rotation of the motor 110 to the air mix door 1 at a reduced speed. The term "drive unit 130" will be used hereinafter for referring to the rotation drive mechanism including the DC motor 110 and reduction mechanism 120.

The reduction mechanism 120 comprises a gear train including a worm gear 121 press-fitted into the output shaft 111 of the motor 110, a worm wheel 122 engaging with the worm gear 121, and a plurality of spur gears 123, 124. The last-stage gear (output gear) 126 is provided with an output shaft 127. The drive unit 130 is accommodated in a casing 140, to which electrical contact brushes 155–157 are fixed, as will be described later.

Figure 6:
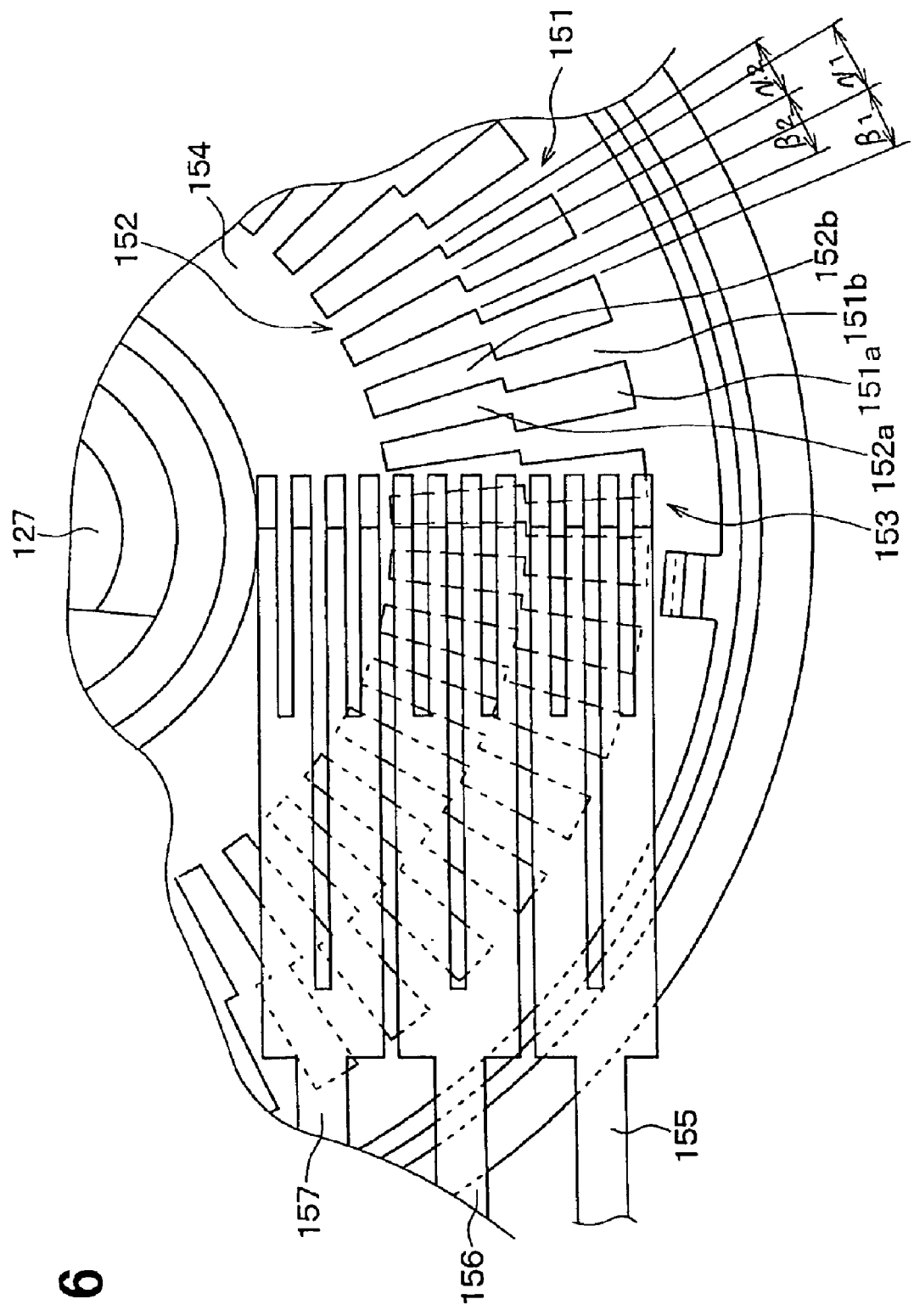
FIG. 6 is an enlarged sectional view of the pulse plate according to the first embodiment.

On the output side of the input gear (worm gear 121) that is directly driven by the motor 110, i.e., on the side of the output shaft 127 of the reduction mechanism 120, is provided a pulse pattern plate 153 (hereinafter "pattern plate") as shown in FIGS. 3 to 6, which rotates with the output shaft 127. As shown in FIG. 6 in detail, the pattern plate 153 includes first and second pulse patterns 151, 152 consisting of circumferentially alternating conductive portions 151a, 152a and non-conductive portions 151b, 152b, and a common pattern 154 consisting of a conductive portion 154a and a non-conductive portion 154b. The common pattern 154 is located on the inner side of the first and second pulse patterns 151, 152.

The pattern plate 153 has a circular-arc rotation-detecting region 300 in which the angles of circumference $\alpha 1$, $\alpha 2$, $\beta 1$, $\beta 2$ of the conductive and non-conductive portions 151a, 152a, 151b, 152b are all equal. The first pulse pattern 151 is offset from the second pulse pattern 152 by about half the circumferential angles $\alpha 1$, $\alpha 2$, $\beta 1$, $\beta 2$. The common pattern 154 consists only of the conductive portion 154a in the region 300. The rotation-detecting region 300 generates pulse signals in a certain pattern for detecting rotation angles as will be described later.

The pattern plate 153 also includes a fan-shaped initialization region 301 where the first and second pulse patterns 151, 152 consist only of conductive portions 151a, 152a, respectively, and the common pattern 154 consists of the non-conductive portion 154b sandwiched between the conductive portions 154a in the circumferential direction. The initialization region 301 generates pulse signals in a certain pattern (hereinafter "initialization pattern") for indicating a starting point of the motor.

The conductive portions of the first and second pulse patterns 151, 152 are electrically connected to each other, and so are the respective non-conductive portions. In addition, the conductive portions 151a, 152a of the first and second pulse patterns 151, 152 are electrically connected to the conductive portion 154a of the common pattern 154 by a connecting member (not shown).

On the casing 140, fixed by resin molding, are the first to third electrical contact brushes 155–157, which may be made of copper (conductive material) and connected to the positive side of the battery. The first to third contact brushes 155–157 are in contact with the first, second, and common pulse patterns 151, 152, 154, respectively.

In this embodiment, the first to third contact brushes 155–157 are in contact with the pattern plate 153 at two points or more (four in the illustrated example) to ensure the electrical connection between the contacts and conductive portions.

A link lever 160 is fixed to the output shaft 127 by press fitting for turning the air mix door 1 as shown in FIG. 2. Stoppers 5a, 5b are provided in the air conditioning system casing 5. The stoppers 5a, 5b are used to stop the rotation of the motor 110 with the link lever 160 hitting against one of the stoppers 5a, 5b in the event of a failure in electrical control of the motor's rotation.

Figure 7:
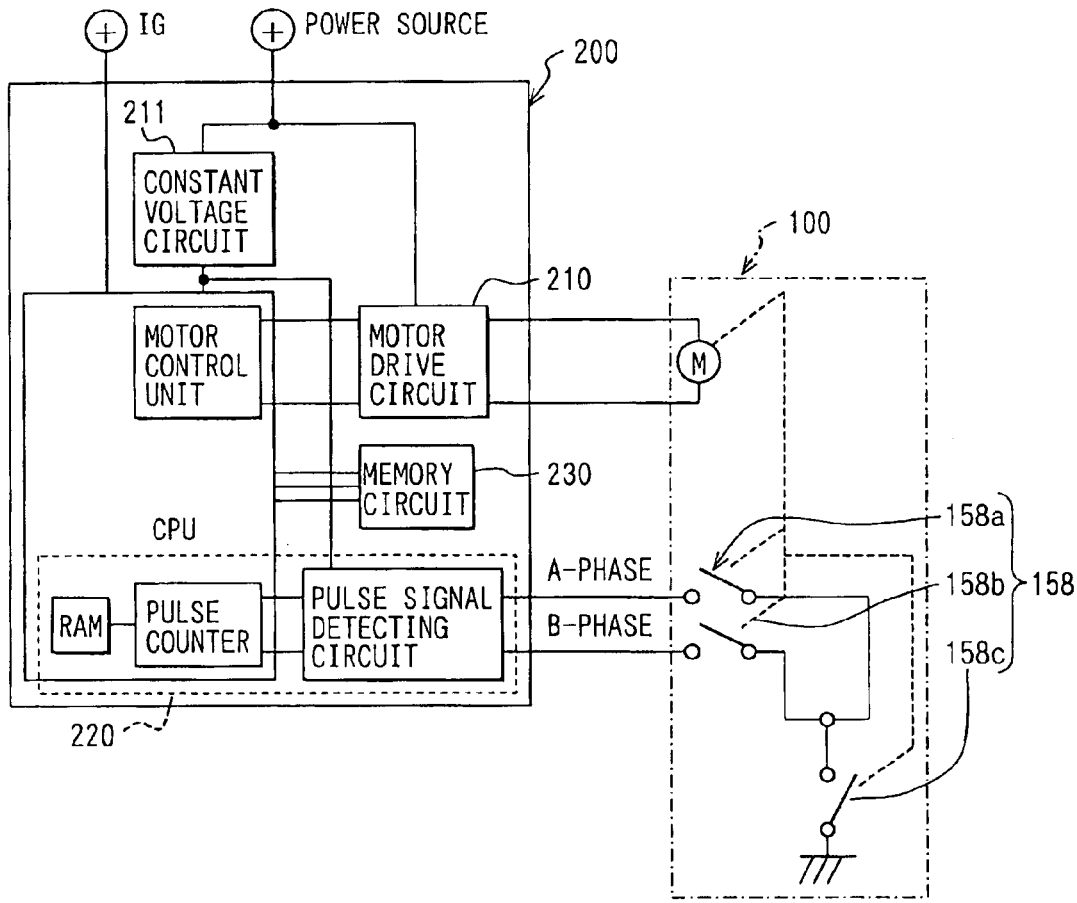
FIG. 7 is a diagram of the control circuit of the electric actuator according to the first embodiment.

The actuator 100 is operated as follows:

FIG. 7 is a diagram illustrating the electrical control circuit 200 of the actuator 100 serving as motor control means. The circuit 200 includes a battery-powered constant voltage circuit 211 that outputs constant voltage to other circuits, a motor drive circuit 210 for driving the motor DC 110, a rotation angle sensor (rotation angle detecting means) 220 for detecting the rotation angle and rotation direction of the output shaft 127 based on pulse signals generated by the pattern plate 153, and a memory circuit 230 that can store and retain various input control data without a power supply, such as EEPROM.

Figure 8:
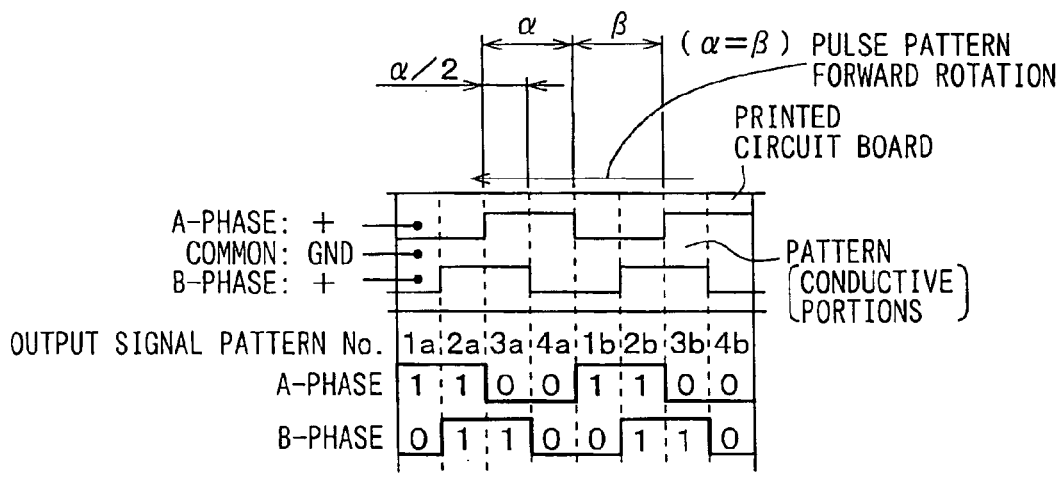
FIG. 8 is a chart of a pulse signal pattern for detecting the rotation angle of the DC motor of FIG. 3.

When the output shaft 127 and the pattern plate 153 is rotated by the motor 110 and the first to third contact brushes 155–157 are in contact with the rotation detecting region 300, the pattern plate 153 generates signals. The signals are generated in a cyclic pattern of two, ON and OFF, states, as the first and second contact brushes 155, 156 make contact with the conductive portions 151$a$, 152$a$ and non-conductive portions 151$b$, 152$b$ alternately, while the third contact brush 157 is in contact with the conductive portion 154$a$. Thus, pulse signals are generated by the first and second contact brushes 155, 156 as shown in FIG. 8 each time the motor 110 rotates a preset angle. The rotation angle sensor 220 detects the rotation angle of the output shaft 127 by counting the number of the pulse signals. When the first to third contact brushes 155–157 make contact with the initialization region 301 of the pattern plate 153 on the rotating output shaft 127, as shown in FIG. 9, the third contact brush 157 makes contact with the conductive portion 154$a$ (ON), non-conductive portion 154$b$ (OFF), then conductive portion 154$a$ again (ON) in succession, while the first and second contact brushes 155, 156 are in contact with the conductive portions 151$a$, 152$a$.

Figure 9:
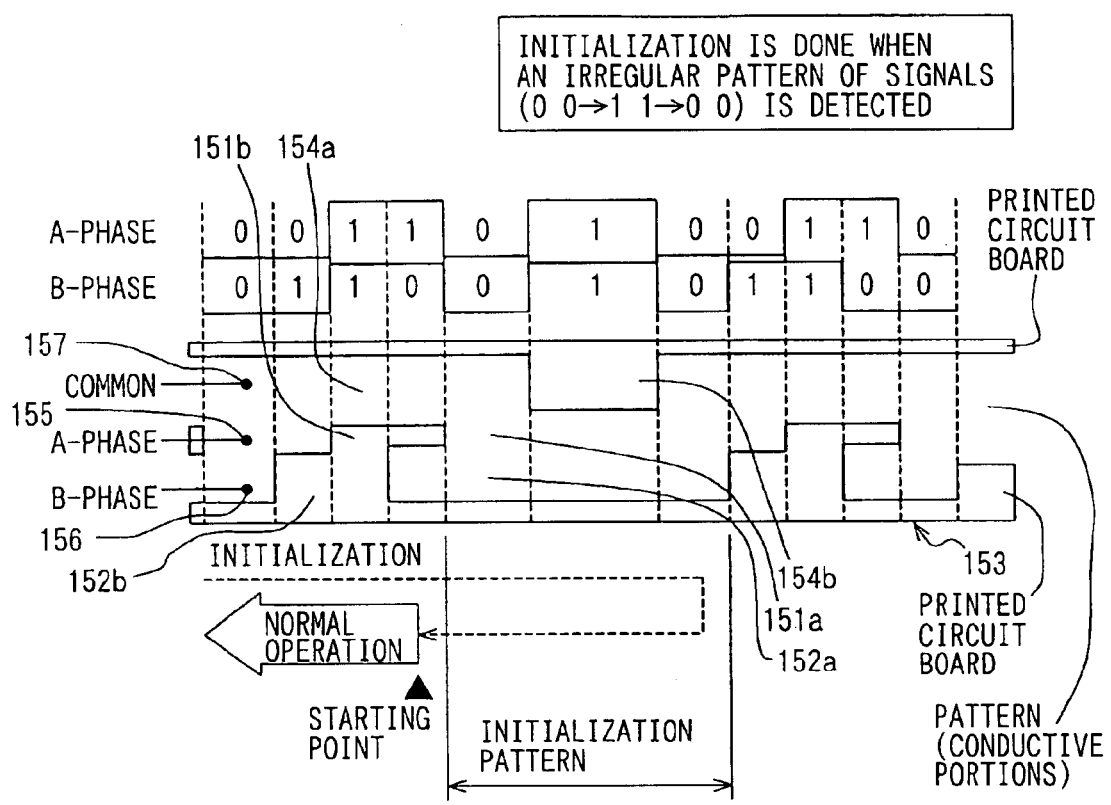
FIG. 9 is a chart of an initialization pattern of pulse signals for detecting the starting point of the DC motor of FIG. 3.

Thus two-phase pulse signals (A-phase, B-phase) are generated in accordance with the rotation angle of the motor 110 as shown in FIG. 9, which is termed here as an "initialization pattern." In FIG. 9, a "0" indicates a logic-zero or low-level signal, while a "1" represents a logic-one or high-level signal. Unlike the pattern of FIG. 8 where the amplitude of two-phase pulse signals switches over alternately, both phases of the pulse signals switch from the low level "00" to high level "11" and to the low level "00" simultaneously.

Thus, in the initialization pattern the amplitude of the two-phase pulse signals change at the same time, unlike the pattern for detecting the rotation angle of the motor 110. When the rotation angle sensor 220 detects this initialization pattern of two-phase pulse signals, the motor drive circuit 210 stops power supply to the motor 110, thereby restricting the rotation of the motor 110 electrically. At the same time, the position where the two-phase pulse signals were detected is stored as a starting point. After that, the circuit 210 controls the motor 110 using the position that is offset by one pulse from the starting point as a reference point, except when the battery has been removed or there is an abnormality in the pulse signals, as will be described later.

Hereinafter the whole procedure of detecting the two-phase pulse signals (initialization pattern) with the rotation angle sensor 220, electrically controlling the motor 110 to stop its rotation, storing the position where the two-phase pulse signals were detected as a starting point, and setting a position offset from this starting point as a reference point, will be termed "initial position setting." As is clear from the above, the first to third contact brushes 155–157 and pattern plate 153 constitute a pulse generator 158 (pulse generating means) including switching means 158$a$–158$c$ (see FIG. 7), which generates pulse signals in accordance with the predetermined rotation angle of the output shaft 127.

The switching means 158$a$, 158$b$ are respectively formed by contact brush 155 and first pulse pattern 151, and contact brush 156 and second pulse pattern 152; they are connected in parallel between the constant voltage circuit (power source circuit) and ground, and turned on and off, thus generating the two-phase pulse signals, as the motor 110 rotates. Switching means 158$c$ is formed by the third contact brush 157, one end of which is electrically connected to ground, and common pulse pattern 154, and turned on and off between the switching means 158$a$, 158$b$ and ground as the motor 110 rotates.

Figure 10:
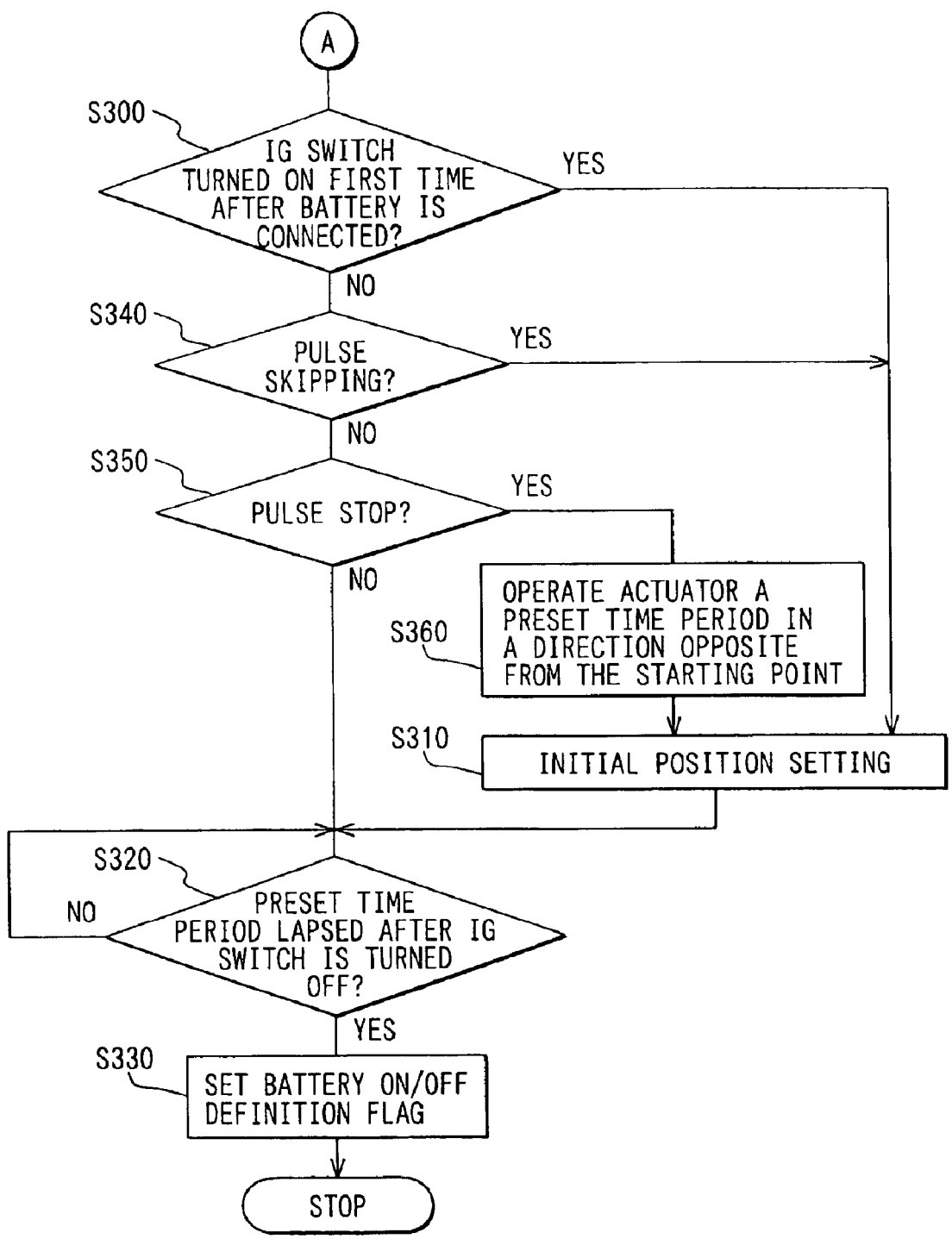
FIG. 10 is a control flowchart continuing from the flowchart of FIG. 11 of the electric actuator according to the first embodiment.
Figure 11:
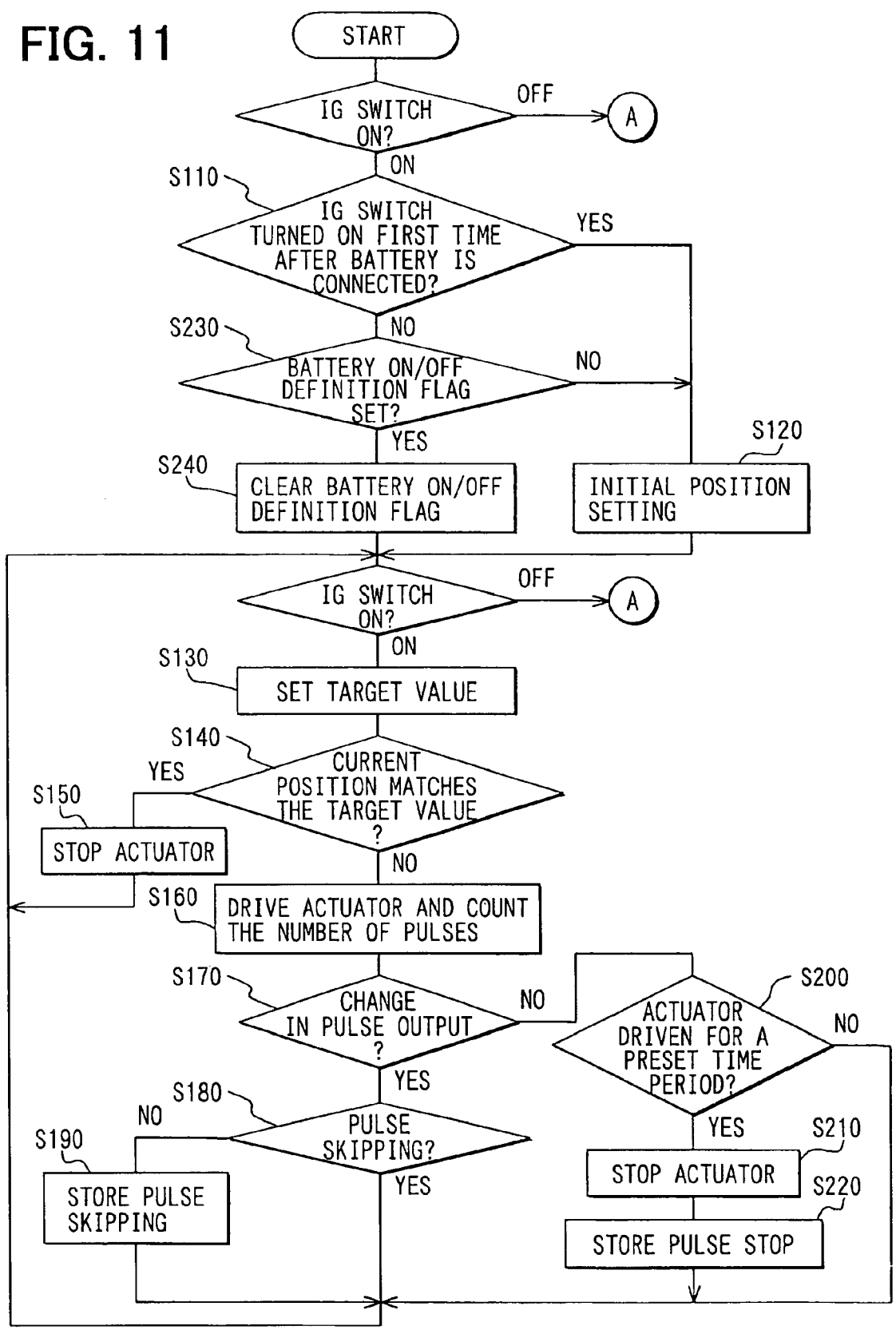
FIG. 11 is a control flowchart of the electric actuator according to the first embodiment.

Because the first and second pulse patterns 151, 152 are offset from each other, the pulse generator 158 generates two pulse signals with a phase difference, one being generated by the first pulse pattern 151 and first contact brush 155 (hereinafter referred to as "A-phase pulse") and the other being generated by the second pulse pattern 152 and second contact brush 156 (hereinafter "B-phase pulse"). In this embodiment, the rotation direction of the motor 110 or output shaft 127 is determined based on which of the A-phase pulse and B-phase pulse is first input to the rotation angle sensor 220. The control operation of the actuator 100, or its motor 110, will be described next with reference to the flowcharts of FIG. 10 and FIG. 11.

When the ignition switch (IG switch) of the vehicle is on, it is determined whether the ignition switch has been turned on for the first time after the battery is connected based on a flag stored in the memory circuit 230 (S110), and if Yes, the initial position setting is performed (S120). Then, if the ignition switch is on, the motor 110 is controlled so that the air mix door 1 is brought to a target position or its degree of opening reaches a target rotation angle (S130–S220). Here, ignition switch means a start-up switch that allows power supply to the motor 110.

If the ignition switch has not been turned on for the first time after the battery is connected, it is determined whether a "battery ON/OFF definition" flag (bit) that indicates whether or not the battery is connected is set in the memory circuit 230 (S230). If the flag is not set, the initial position setting is performed (S120), and the motor 110 is controlled so that the target degree of opening of the air mix door 1 is achieved (S130–S220). If the flag is set, the value of the bit is changed to a zero to clear the flag from the memory circuit 230 (S240), after which the motor 110 is controlled so that the air mix door 1 is brought to the target position (S130–S220).

During this control of the motor 110 for achieving the target degree of opening of the air mix door 1, that is, when the motor 110 is supplied with a drive current for running, if the pulse signals stop changing, it is likely that there is a failure in the pulse signal output. Therefore, if there is no change in the pulse signals after the lapse of a preset time period after the start of power supply to the motor, the actuator 100 is stopped (S210), and data indicating that there is no pulse signal change is stored in the memory circuit 230 (S220).

On the other hand, if the pulse signals are changing when the motor 110 is supplied with a drive current for running, it is determined whether the output pulse waveform has a regular pattern of FIG. 8 and whether there is any pulse skipping (S180). If the pulse pattern is the regular one, the process goes back to S130 and the motor 110 is controlled to achieve the target degree of opening of the air mix door 1, while, if there is pulse skipping, data indicative of the presence of pulse skipping is stored in the memory circuit 230 (S190), after which the process goes back to S130.

In the case where pulse skipping has occurred while the motor 110 is controlled, the position of the air mix door 1 set by controlling the motor 110 is likely to be displaced from the target position. Therefore, the initial position setting is performed again after turning off the ignition switch, as will be described later.

If the ignition switch has been turned off for the first time after the battery is connected, the initial position setting is performed (S300, S310), and after a preset period of time has passed after the ignition switch is turned off, the battery ON/OFF definition flag is set in the memory circuit 230 (S320, S330).

The period of time set here is shorter than the time period during which power supply to vehicle electrical systems from the battery is stopped so as to minimize energy consumption caused by dark current. The battery ON/OFF definition flag set in the memory circuit 230 indicates that the battery is connected to the vehicle, and if there is no flag in the memory circuit 230, it shows that the battery has been removed.

If the ignition switch has not been turned off for the first time after the battery is connected, it is determined whether there has been pulse skipping based on the data stored in the memory circuit 230 (S340). If there has been pulse skipping during the motor 110 is running, the initial position setting is performed (S310), and after a preset period of time has passed after the ignition switch is turned off, the battery ON/OFF definition flag is set in the memory circuit 230 (S320, S330).

If there has been no pulse skipping, it is determined whether there has been discontinuity in the pulse signals based on the data stored in the memory circuit (S350). If Yes, the motor 110 is rotated in an opposite direction from the direction in which it was rotating just before the discontinuity of the pulse signals, after which the initial position setting is performed (S360, S310).

In this embodiment, the initial position setting is performed after the motor 110 is rotated in the opposite direction from the direction toward the starting point. According to this embodiment, the following effects are achieved. That is, when the rotation angle sensor 220 detects the initialization pattern pulse signals, power supply to the motor 110 is stopped by control of the motor drive circuit 210. This electrical control of motor rotation enables the initialization to be carried out without using mechanical restriction means, and the influence of variations in the deflection amount of, e.g., stoppers, is thereby eliminated. The precision in determining the starting point in the initialization procedure is thus improved, and one electronic control unit can be used in common among the actuators. Furthermore, because the initialization is performed without using a locking mechanism, increases in the size of the device and production costs are prevented.

The initialization pattern includes two or more simultaneous changes in the amplitude of the A-phase and B-phase pulse signals. It is highly unlikely that the simultaneous changes of the two-phase pulse signals in the sequence of the low-level signal, high-level signal, and low-level signal result from an irregularity in the amplitude of the pulse signals caused by the entry of foreign matter. Thus, erroneous detection of this initialization pattern should not occur.

In this embodiment, the initialization pattern pulse signals are generated by the third contact brush 157 sequentially making contact with the conductive portion 154a (ON), non-conductive portion 154b (OFF) and conductive portion 154a (ON), so that the amplitudes of both A-phase and B-phase pulse signals switch from the low level to the high level and to the low level at the same time.

Figure 12A:
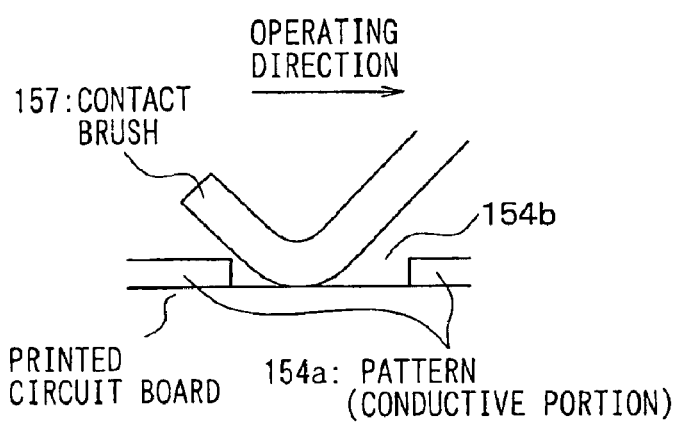
FIG. 12A is a diagram of wear of the contact brush of FIG. 6, as it relates to the period of the high-level signal of FIG. 12B.
Figure 12B:
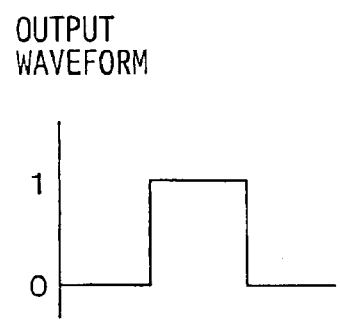
FIG. 12B is a waveform period of a high-level signal as it relates to the wear of the contact brush of FIG. 12A.
Figure 12C:
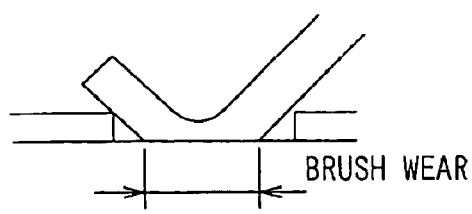
FIG. 12C is a diagram of wear of the contact brush of FIG. 6, as it relates to the period of the high-level signal of FIG. 12D.
Figure 12D:
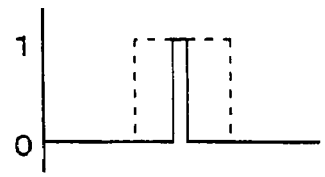
FIG. 12D is a waveform period of a high-level signal as it relates to the wear of the contact brush of FIG. 12C.

The low-level or logic-zero signal of each of the A-phase and B-phase pulse signals is output when the third contact brush 157 is in contact with the conductive portion 154a, and the high-level or logic-one signal is output when the third contact brush 157 is in contact with the non-conductive portion 154b (printed circuit board) as shown in FIGS. 12A and 12B. When the contact brush 157 has worn down through contact with the conductive portion 154a and the non-conductive portion 154b, it makes contact with the non-conductive portion 154b in a wider area, whereby the time period of contact between the brush 157 and non-conductive portion 154b (printed circuit board) becomes shorter, as shown in FIGS. 12C and 12D.

Taking into account that the period of high-level signal becomes shorter as the contact brush wears down, the non-conductive portion 154b on the printed circuit board is made larger relative to the conductive portions 154a so as to secure more than a preset period of time in which the high-level signal is output, so as to ensure reliable detection of the high-level signals by the rotation angle sensor 220. If the initialization pattern consisted of changes in the amplitude of the A-phase and B-phase pulse signals from high level to low level and to high level, it would be necessary to provide two non-conductive portions 154b for generating the high-level signals. Compared to such a case, the initialization region 301 of the pattern plate 153 is smaller in this embodiment because it needs only one non-conductive portion 154b to generate the signals. Accordingly, the operable area of the output shaft 127 can be made larger.

According to this embodiment, the initial position setting is performed when it is highly necessary, i.e., when there has been an abnormality in the pulse signal output such as discontinuity or skipping, and the number of times of carrying out the initial position setting is greatly reduced, thereby an increase in the production cost of the actuator 100 is prevented.

Further, while keeping the production cost of the actuator 100 low, the precision in determining the starting point is improved because the setting is made when there has been a discontinuity or skipping in the pulse signals that largely affects the control precision. The initial position setting is performed based on a flag that indicates whether the battery has been removed or not, making much of the conventional initialization procedure unnecessary, which can also contribute to a reduction in the production cost.

In the case in which there has been a discontinuity in the pulse signals, the initial position setting is performed after the motor 110 is rotated in a direction opposite from the one in which it was rotating before the discontinuity in the pulse signals. Therefore, the possibility that the actuator 100 may be locked by the entry of foreign matter is eliminated, and the reliability and durability of the actuator 100 are improved. Moreover, the determination of whether there has been an abnormality in the pulse signals, or whether the pulse signals have stopped changing is made after a lapse of a preset period of time after the start of power supply to the motor. Therefore, this determination of whether there has been an abnormality is made correctly even when the signal changes stop or are reduced due to a temporary drop in the voltage of drive current or a large load.

(Second Embodiment)

Figure 13:
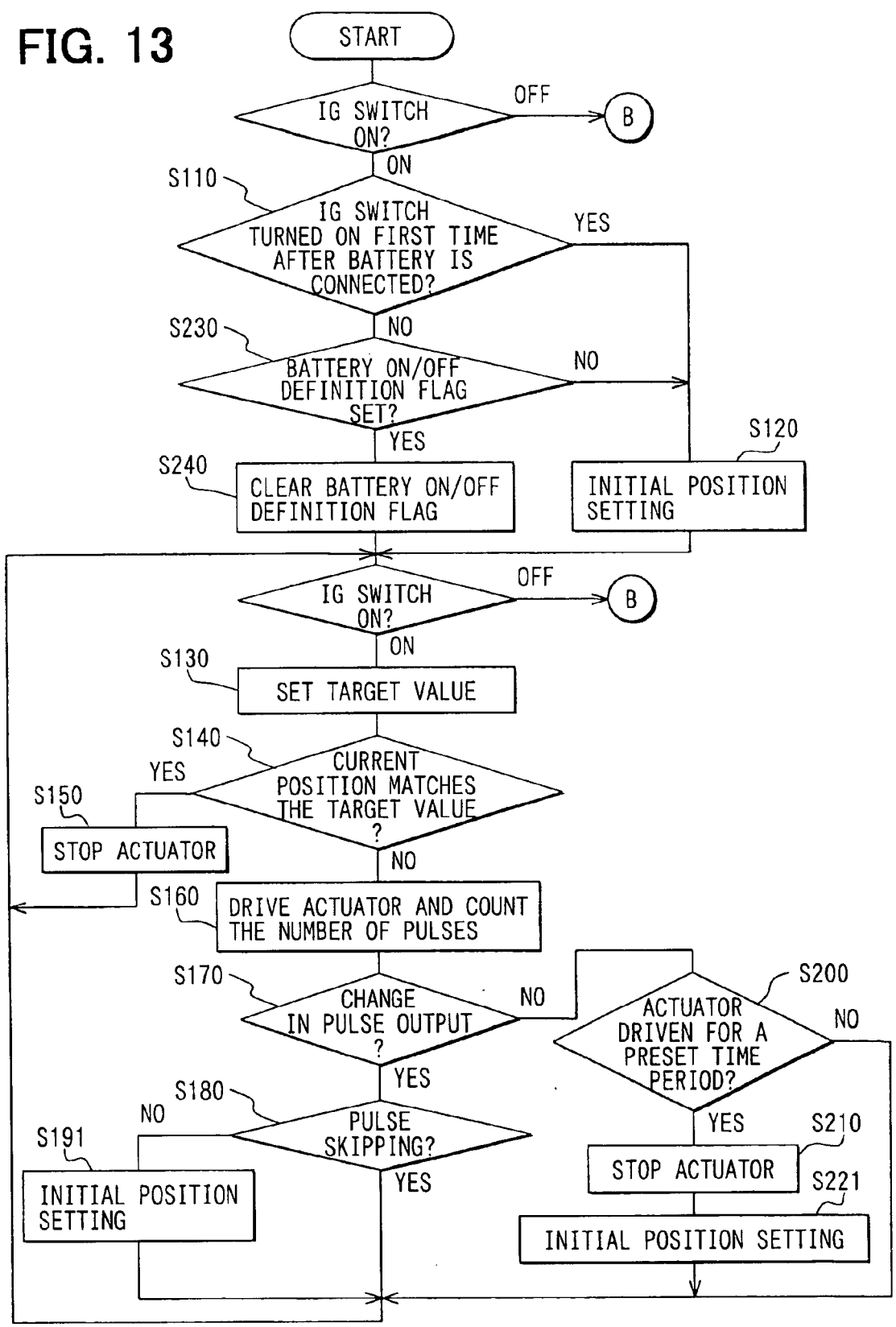
FIG. 13 is a control flowchart of an electric actuator according to a second embodiment of the invention.
Figure 14:
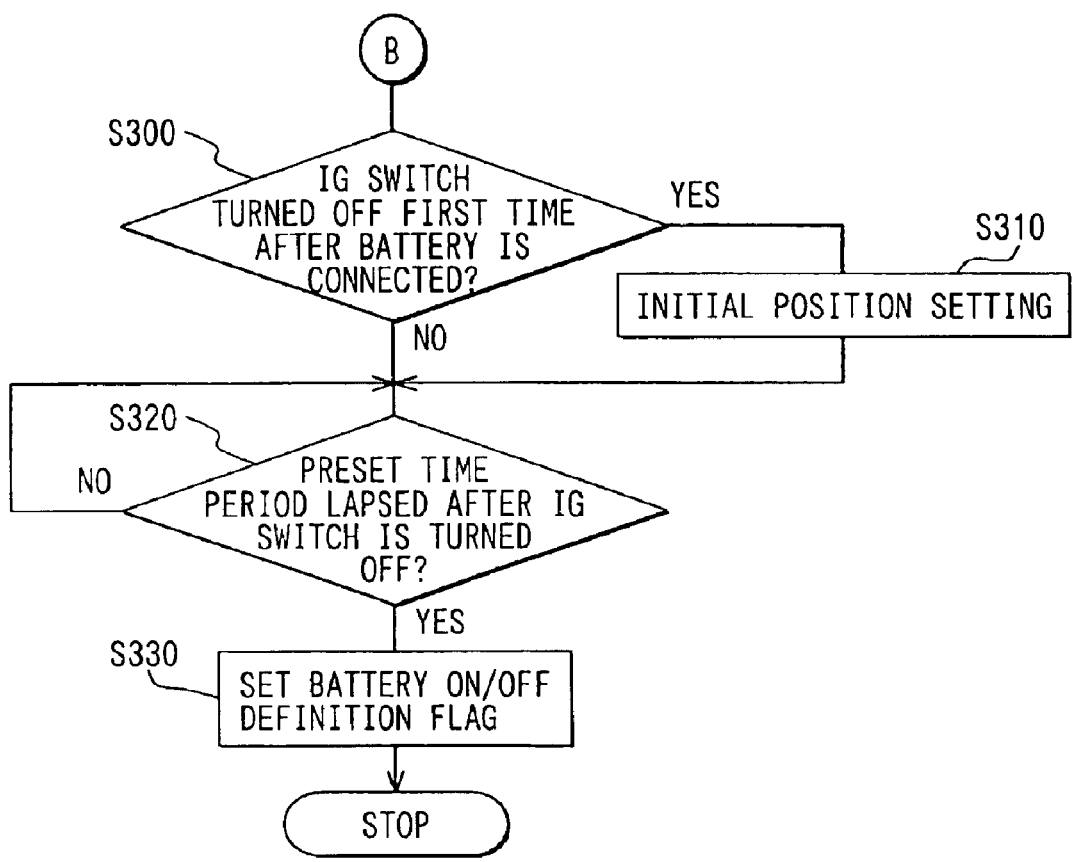
FIG. 14 is a control flowchart of the electric actuator continuing from the flowchart of FIG. 13 according to the second embodiment.

In the first embodiment, when there has been a discontinuity or skipping in the pulse signals, this information is stored in the memory circuit 230, and the initial position setting is performed immediately after the ignition switch is turned off. In this embodiment, as can be seen from FIG. 13 and FIG. 14, the initial position setting is performed immediately after a discontinuity or skipping is detected in the pulse signals (S191, S221). Re-setting of the starting point is thereby achieved at once. After the ignition switch is turned off, the initial position setting is performed only when the ignition switch has been turned off for the first time after the battery is connected.

(Third Embodiment)

Figure 15:
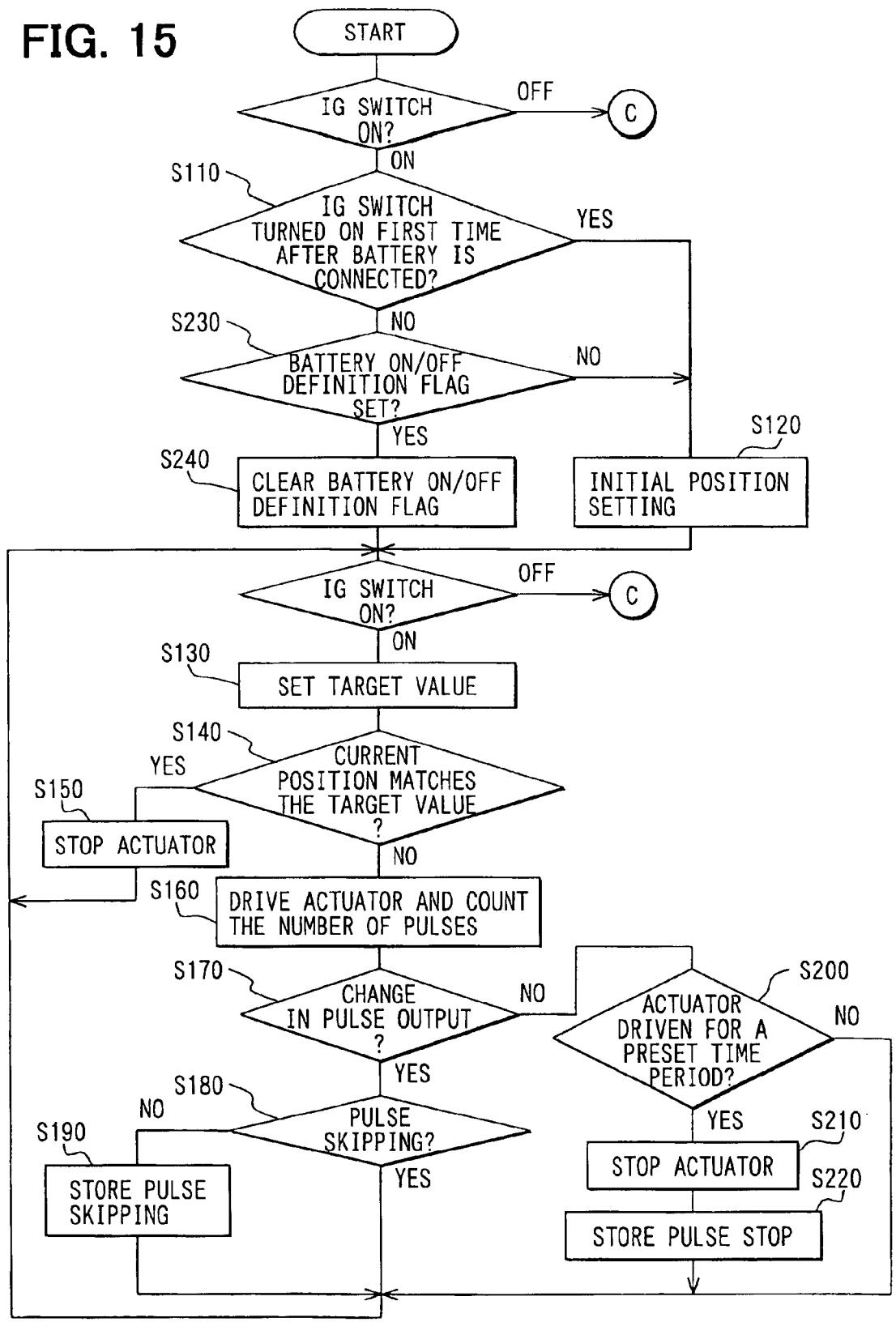
FIG. 15 is a control flowchart of an electric actuator according to a third embodiment of the invention.
Figure 16:
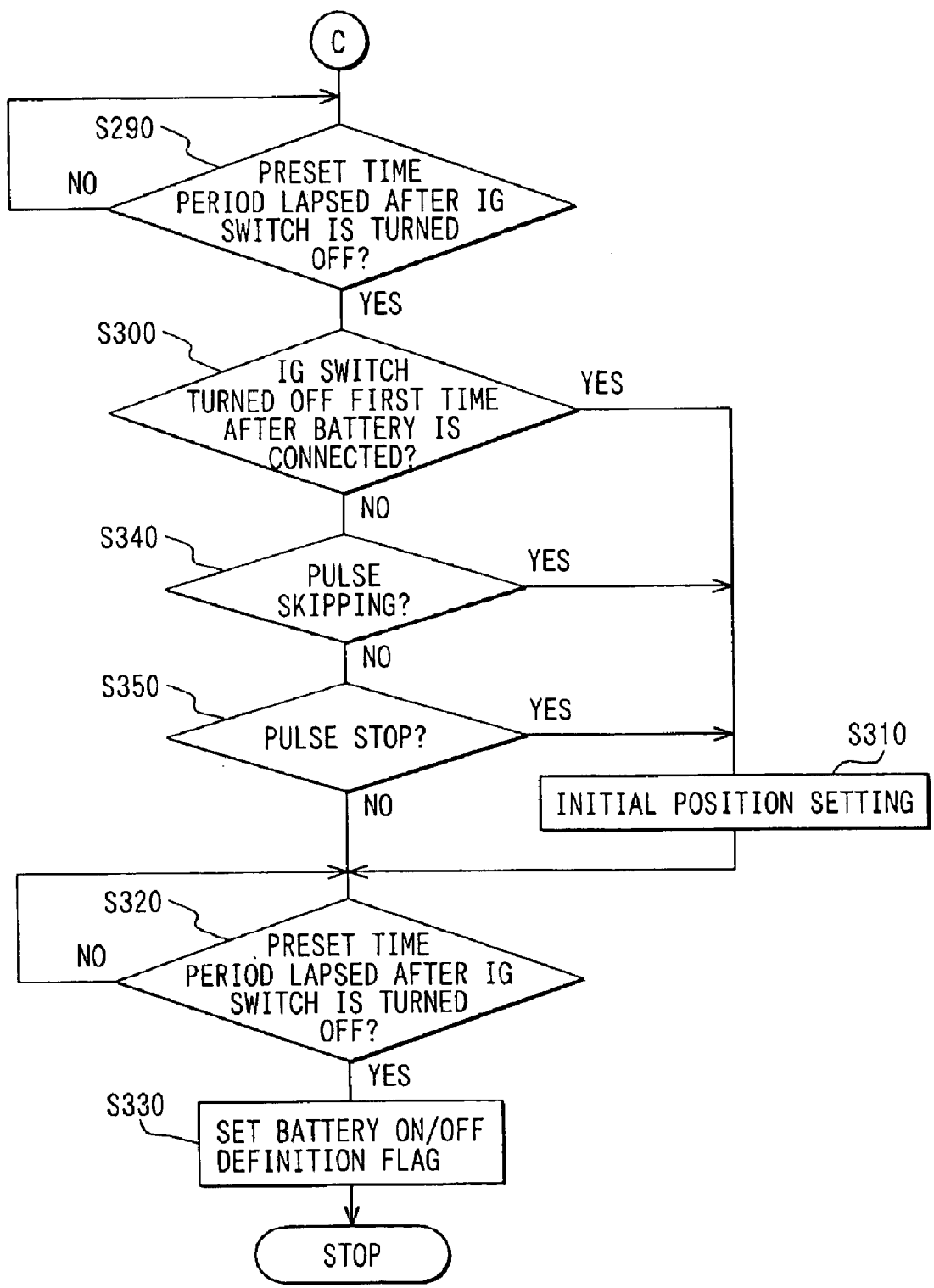
FIG. 16 is a control flowchart of the electric actuator continuing from FIG. 15 according to the third embodiment.

In the first embodiment, when there has been a discontinuity or skipping in the pulse signals, this information is stored in the memory circuit 230, and the initial position setting is performed immediately after the ignition switch is turned off. In this embodiment, as can be seen from FIG. 15 and FIG. 16, when there has been a discontinuity or skipping in the pulse signals, this information is stored in the memory circuit 230, and the initial position setting is performed after a lapse of a preset period of time after the ignition switch is turned off.

Specifically, step S290 is added where it is determined whether a preset time period has lapsed after the ignition switch is turned off, before S300. Thereby, the starting point re-setting is achieved without giving the passengers a feeling of delay.

(Fourth Embodiment)

Figure 17:
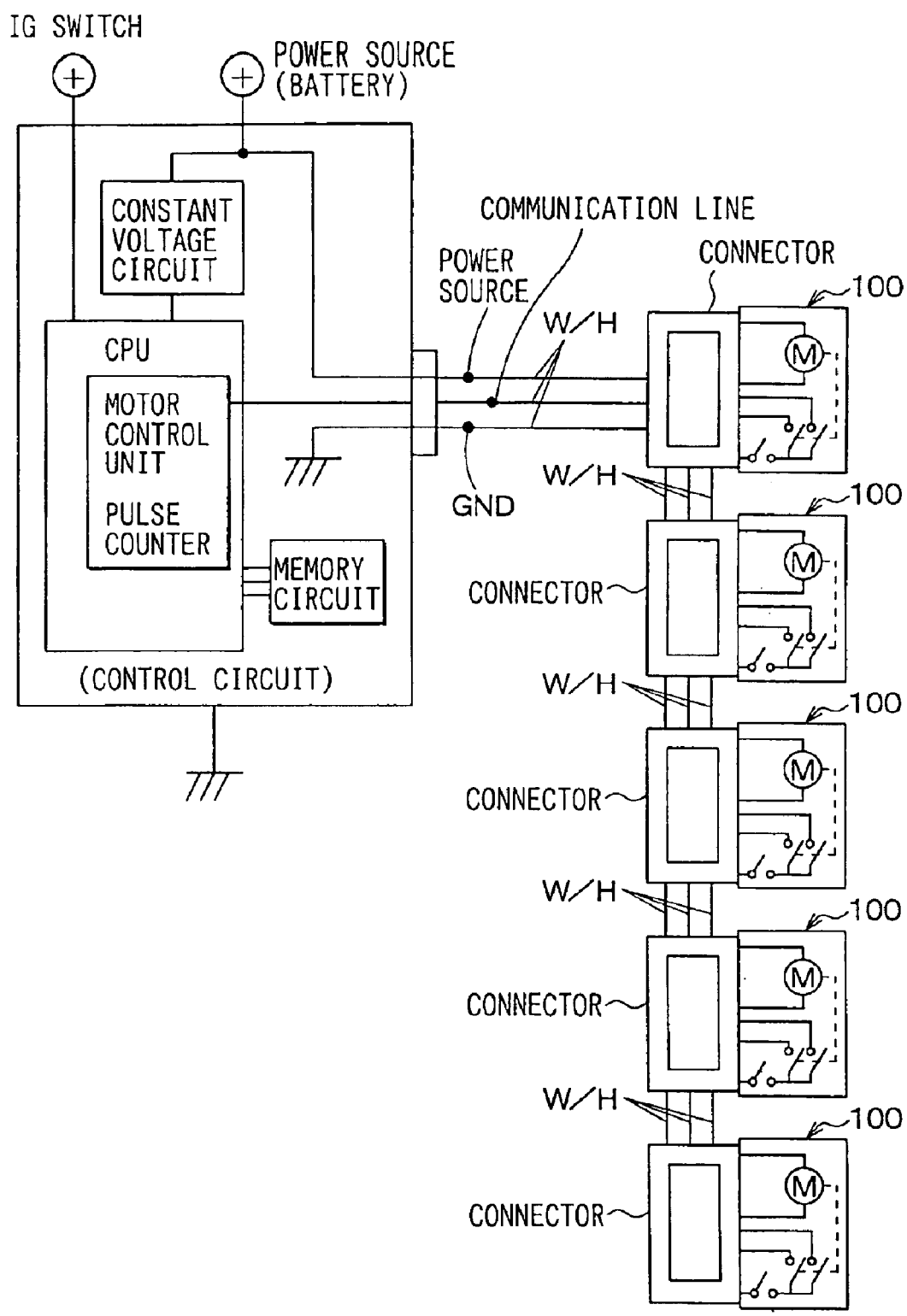
FIG. 17 is a schematic diagram of an electric actuator according to a fourth embodiment of the invention.
Figure 18:
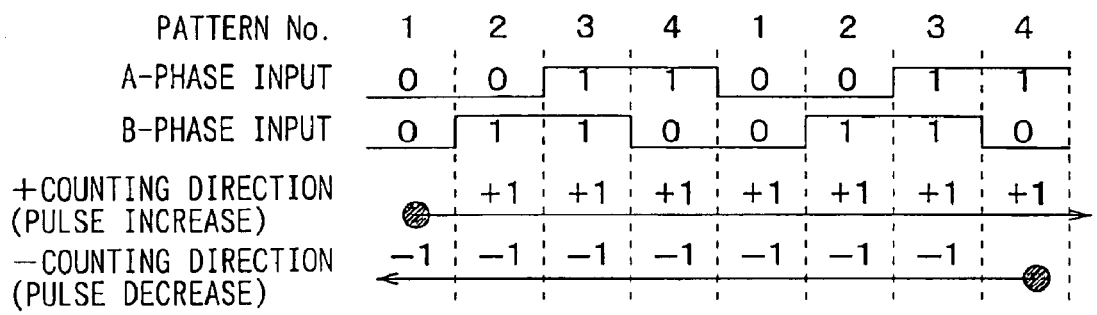
FIG. 18 is a diagram for explaining the operation of an electric actuator according to a fifth embodiment of the invention.

In this embodiment, a plurality of actuators 100 and a control unit are connected by a data communication network as shown in FIG. 17, whereby the number of electric wires is reduced. Between the CPU and each actuator 100, are sent and received data signals for controlling the actuator 100 and data signals regarding the number of pulses in accordance with a preset protocol. Each actuator 100 operates based on data signals transmitted through the communication lines.

(Fifth Embodiment)

In the first embodiment described in the foregoing, the rotation angle of the output shaft 127 is detected based on the count number of the A-phase and B-phase signals ("00," "01," "11," and "10") output from the pulse generator 158 (FIG. 7) so as to control the rotation angle of the air mix door 1 (FIG. 1). When the initialization pattern pulse signals 00-11-00 (FIG. 9) are detected, the motor 110 is stopped and its stopped position is stored as a starting point.

Figure 19:
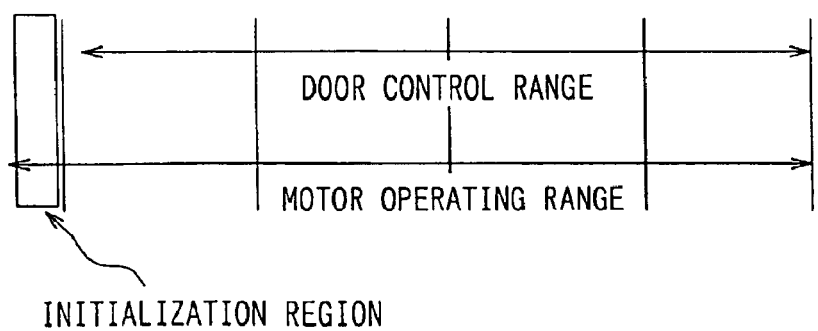
FIG. 19 is a diagram for explaining the position of the initialization region according to the fifth embodiment.

Since the initialization region 301 of the pattern plate 153 (FIG. 4) is disposed on the outer side of the rotation detecting region 300, the first to third contact brushes 155–157 make contact only with the rotation detecting region 300 during the control of the rotation angle of the air mix door 1. That is, as shown in FIG. 19, the initialization region 301 is set within the rotatable range of the actuator 100 (hereinafter also referred to as "motor operating range") but outside of the door control range (corresponding to the rotation detecting region 300) for controlling the rotation angle of the air mix door 1.

Therefore, the pulse generator 158 does not generate the initialization pattern pulse signals during normal operation of controlling the rotation angle of the air mix door 1. Depending on the structure of the actuator 100, however, the initialization region 301 may have to be set within the door control range. In this case, the initialization pattern pulse signals may be output even during normal control of the door rotation angle, upon which the motor 110 and door 1 are stopped, which may give the passengers an odd or uncomfortable feeling.

In this embodiment, to resolve this problem in the case in which the initialization region 301 is located within the door control range, the initialization pattern is recognized during normal operation of controlling the door rotation angle differently than during the initial position setting (which stores the position, where the A-phase and B-phase pulse signals were detected, as a starting point). The actuator 100 in this embodiment is applied to a drive device for driving blowing opening switch doors through a link mechanism (not shown). The actuator 100 rotates its link lever 160, whose rotation is transmitted to the doors through the link mechanism.

Figure 20:
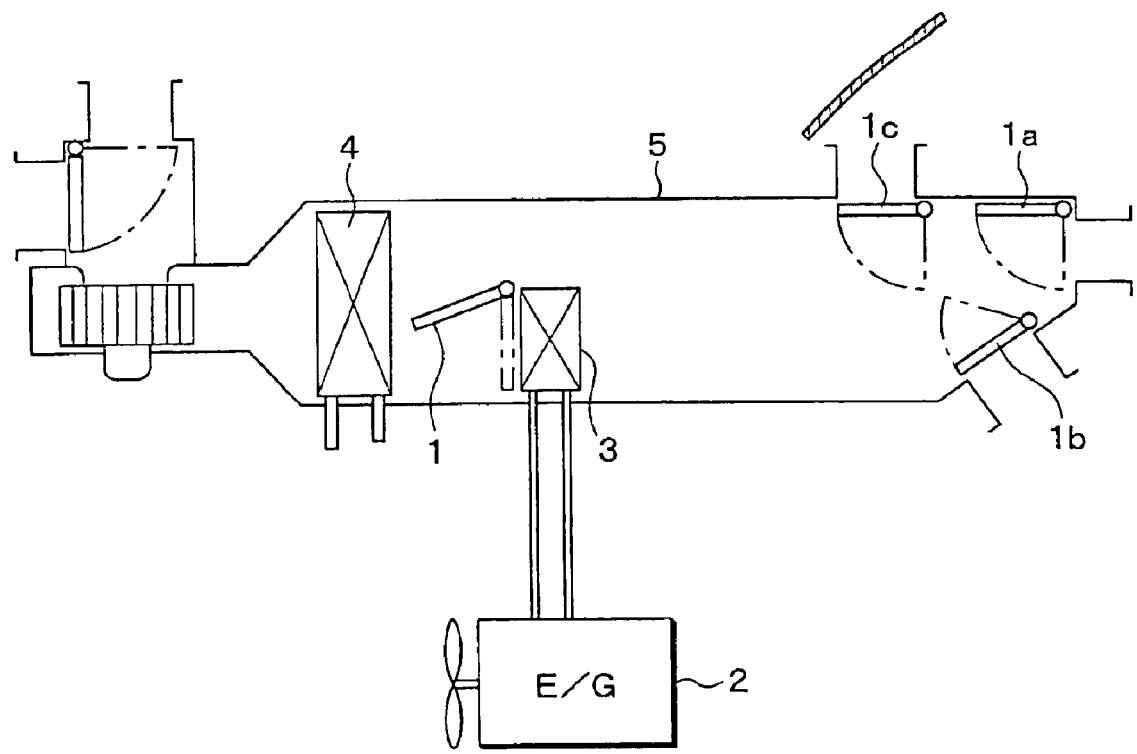
FIG. 20 is a diagram of blowing opening switch doors according to the fifth embodiment.
Figure 21:
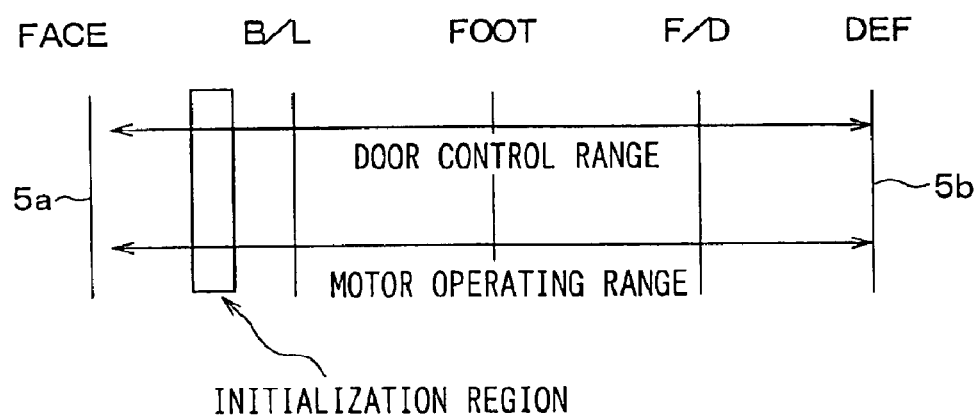
FIG. 21 is a diagram for explaining the position of the initialization region according to the fifth embodiment.

The blowing opening switch doors include a face door 1a, foot door 1b, and defroster door 1c as shown in FIG. 20. The actuator 100 drives these doors 1a to 1c in succession so as to switch the blowing mode from a face mode (FACE) to a bilevel mode (B/L), foot mode (FOOT), foot/defroster mode (F/D), and defroster mode (DEF) as shown in FIG. 21.

Figure 22:
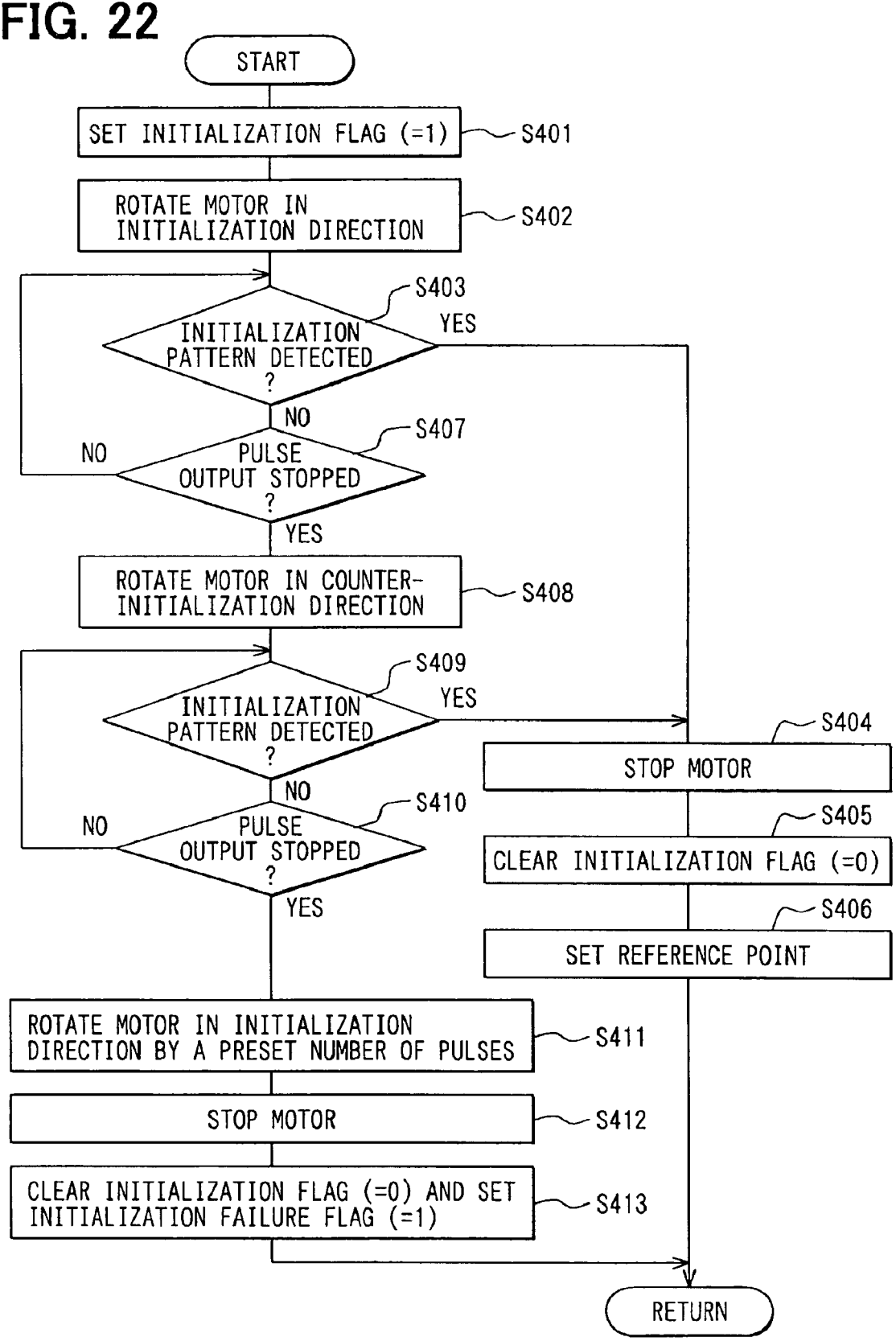
FIG. 22 is a control flowchart of the electric actuator according to the fifth embodiment.

The face door 1a and foot door 1b open and close a face blowing opening and a foot blowing opening for blowing out conditioned air toward the upper and lower half of the body of the passengers, respectively. The defroster door 1c opens and closes a defroster-blowing opening for blowing out conditioned air toward the inner surface of the front windshield glass. The operation of the actuator 100 of this embodiment will be described below with reference to FIG. 22 and FIG. 23. FIG. 22 is a control flowchart of the actuator 100 executed by an electrical control circuit 200 in accordance with a computer program preset in the memory circuit 230.

Figure 23A:
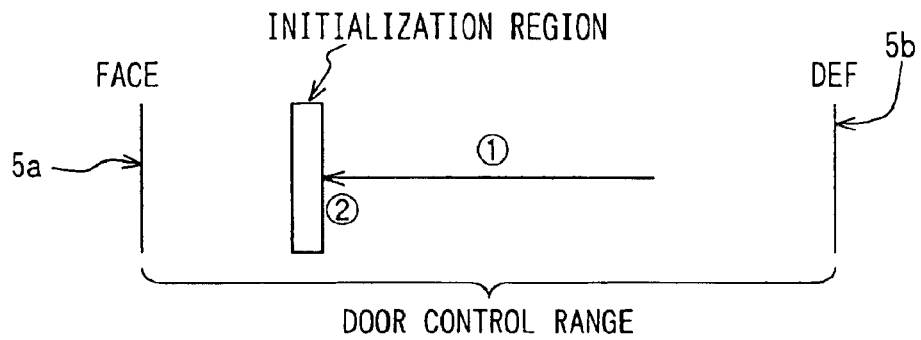
FIG. 23A is a diagram for explaining the operation of the electric actuator according to the fifth embodiment.

When the ignition switch of the vehicle is on, and if it has been turned on for the first time after the battery is connected, it is determined to be necessary to store a starting point and an initialization flag is set in RAM in the memory circuit 230 (S401: setting means). The motor 110 is then controlled to rotate in a predetermined initialization direction (S402). When the initialization pattern pulse signals are detected (S403: Yes) when the motor is rotating in the initialization direction as shown in FIG. 23A, initialization is carried out as follows:

First, power supply to the motor 110 is stopped to stop the motor 110, namely the actuator 100, and the initialization flag is cleared (S404, S405), and then, at this time, the position of the output shaft 127 is stored as a starting point in the memory circuit 230, to set a reference point of the motor 110 (S406).

Figure 23B:
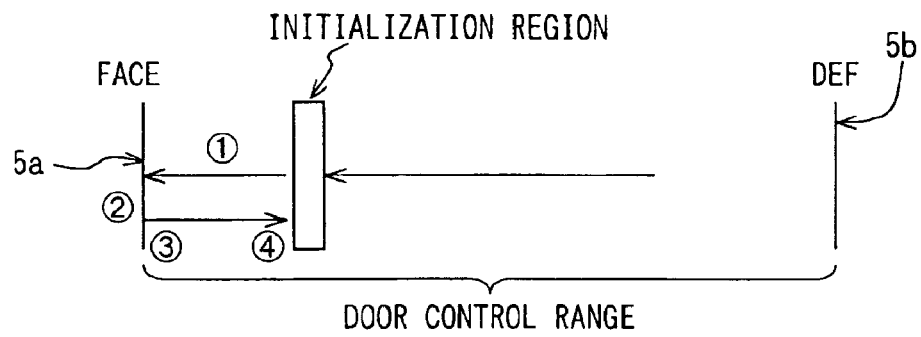
FIG. 23B is a diagram for explaining the operation of the electric actuator according to the fifth embodiment.

If, with the initialization flag being set and the motor 110 being rotated in the initialization direction, the initialization pattern pulse signals are not detected as shown in FIG. 23B and the A-phase and B-phase pulse signals have not been output (namely the amplitude change of the A-phase and B-phase pulse signals has stopped), it is determined that the link lever 160 has hit the stopper 5a and the motor 110 is thereby locked (S407). In this case, the motor 110 is rotated in an opposite direction from the initialization direction (hereinafter "counter-initialization direction") (S408). If, after that, the initialization pattern pulse signals are detected, then the motor is stopped (S404), the initialization flag is cleared (S405), and a reference point is set (S406).

If, with the motor 110 being rotated in the counter-initialization direction, the initialization pattern pulse signals are not detected and the A-phase and B-phase pulse signals have not been output, it is determined that the link lever 160 has hit the stopper 5b and the motor 110 is thereby locked. In this case, it is determined that there has been a failure in detecting the initialization pattern pulse signals. The motor 110 is rotated again in the initialization direction, and when a fixed number of pulse signals has been counted within the rotation detecting region 300 (S411), the power supply to the motor 110 is stopped (S412). Then an initialization failure flag indicative of the failure in detecting the initialization pattern pulse signals is set (S413).

During the normal operation of successively switching the blowing opening door mode by the control of the rotation angle of the motor 110, the initialization flag is cleared. In this state, the CPU determines that it does not need to store a starting point, and keeps the motor 110 rotating even when the initialization pattern pulse signals are detected (which corresponds to the control means as set forth in claim 22).

According to this embodiment, the motor 110 is stopped upon detection of the initialization pattern pulse signals during initial position setting in which the motor 110 is rotated to the starting point, but the motor 110 is kept rotating even if the signals are detected during normal operation of the motor 110. The initialization pattern is thus recognized in the initialization procedure differently than in the normal operation. The motor 110 keeps rotating during normal operation even when the initialization pattern pulse signals are detected, so as not to give the passengers an odd feeling.

The initialization direction mentioned above in which the motor 110 is first rotated is determined as follows:

In the example shown in FIG. 23A, the region from the initialization region 301 to the stopper 5b is larger than that to the stopper 5a within the door control range. Therefore, the possibility of the motor 110 stopping in the region on the side of the stopper 5b is higher than that on the side of the stopper 5a.

Accordingly, the possibility of detecting the initialization pattern pulse signals in a short period of time is higher if the initialization direction is from the stopper 5b toward the stopper 5a than if it is the opposite. That is, the initialization direction should be from the larger region toward the smaller region of the two regions on both sides of the initialization region 301 within the door control range so as to detect the initialization pattern faster. With the initialization direction being thus determined based on the possibility of detecting the initialization pattern faster, the initialization procedure can be complete in a short period of time. If the initialization region 301 is located in the middle of the door control range, the initialization direction cannot be determined based on the possibility of detecting the initialization pattern faster.

Or, even if, for example, the direction from stopper 5b toward stopper 5a is determined to be the initialization direction based on the detection possibility, there may be cases where stopper 5a cannot fulfill its function because of, for example, insufficient mechanical strength if the thickness of the air conditioning system casing 5 in a portion where the stopper 5a is mounted is not large enough. Sometimes the structure of the casing 5 does not allow a stopper 5a to be installed because the mechanical strength of the mounting portion is not high enough and it cannot withstand the impact of hitting from the link lever 16.

In this case, the initialization direction is determined based on the mechanical strength of either end of the door control range of the air conditioning system casing 5. Basically, the direction from one end that is mechanically weaker toward the other end is determined to be the initialization direction.

(Sixth Embodiment)

Figure 24:
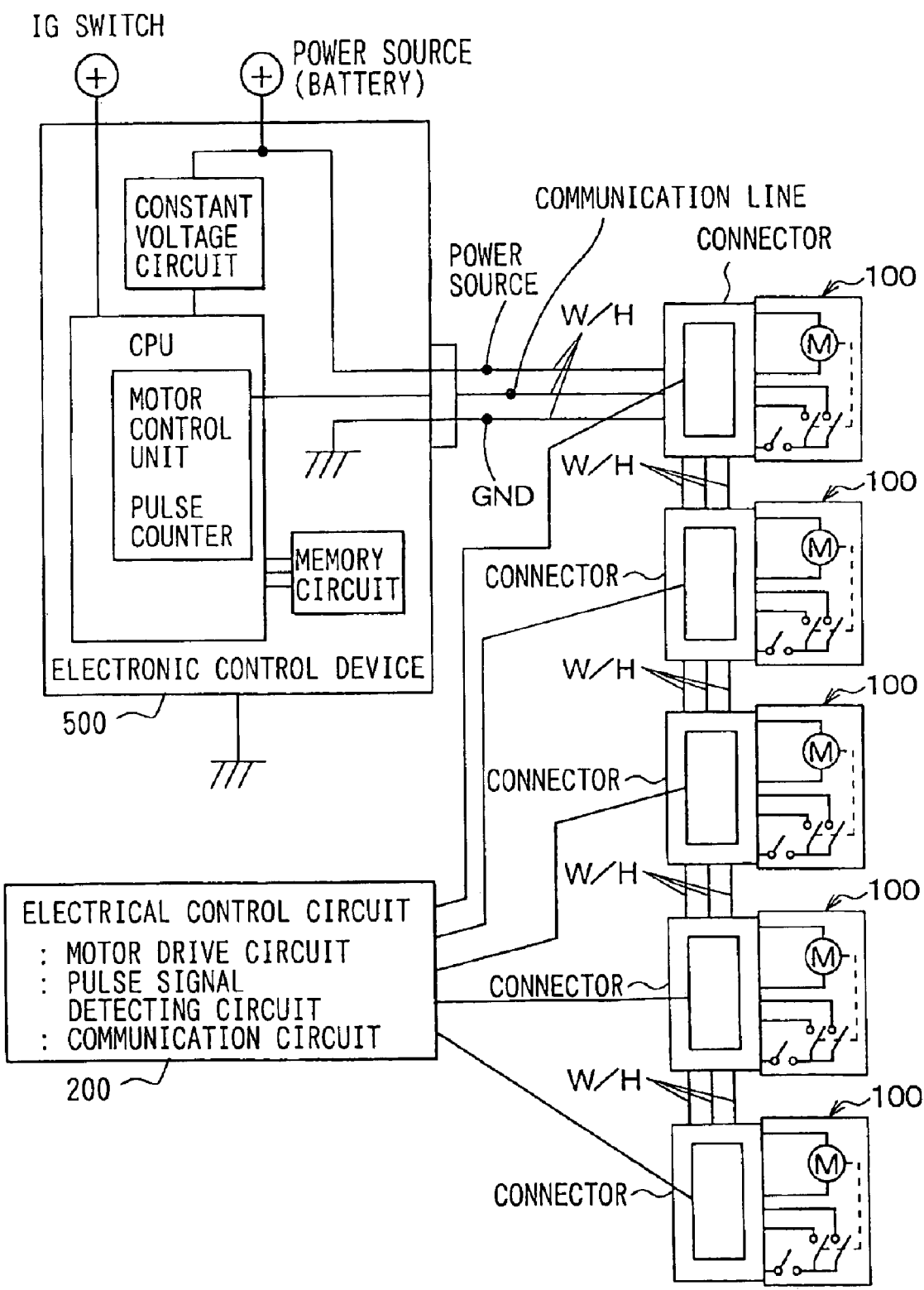
FIG. 24 is a schematic diagram of a sixth embodiment of the invention.

FIG. 24 shows a sixth embodiment of the invention. An electronic control device 500 is connected to a plurality of actuators 100 by a data communication network, and controls them through multiple communication paths such that the initialization pattern is recognized in the normal operation differently from in the initialization procedure.

Each of the actuators 100 has an electrical control circuit 200, which includes a communication circuit in addition to the motor drive circuit 210 and rotation angle sensor 220 described in connection with the first embodiment. The communication circuit provides access to the CPU of the electronic control device 500 through a communication line. The electrical control circuit 200 is built in a connector for connecting the actuator 100 with a communication line, power source line, and ground line.

The electronic control device 500 includes a central processing unit (CPU), memory circuit, constant voltage circuit, etc. The CPU sends data on a target position to each electrical control circuit 200, which respectively controls the rotation of the output shaft 127 of the actuator 100 to reach the target position. The memory circuit stores computer programs and CPU processing data. The constant voltage circuit is powered by the battery on the vehicle and supplies a constant voltage to the CPU, memory circuit, and to the plurality of electrical control circuits 200 through the power source lines.

Figure 25:
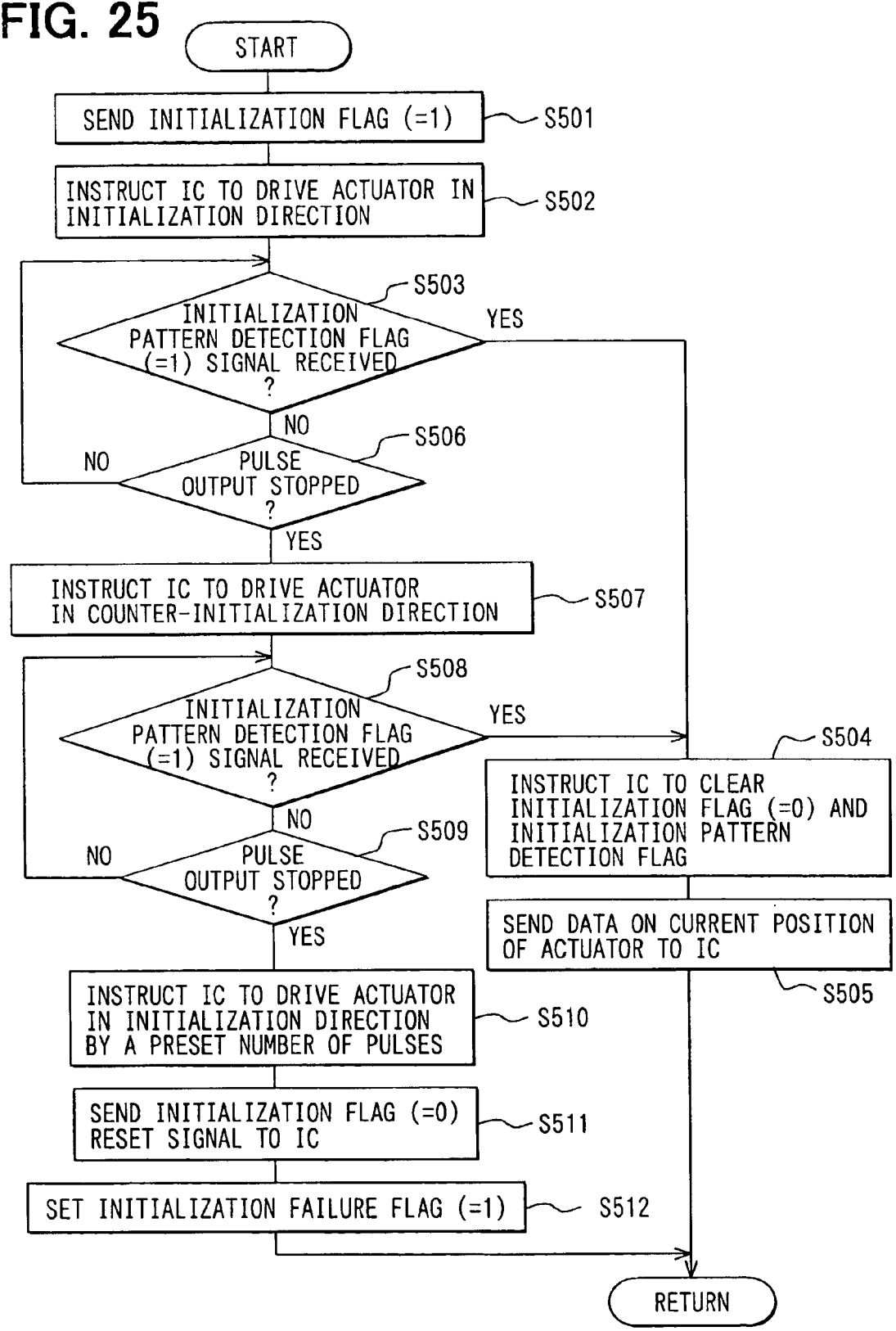
FIG. 25 is a control flowchart of an electronic control unit according to the sixth embodiment.

One example of the operation in this embodiment will be described below with reference to FIG. 25, wherein the electronic control device 500 causes one of the actuators 100 to execute initialization. FIG. 25 is a flowchart of communication control processing performed by the electronic control device 500 in accordance with a computer program. The electrical control circuit 200 is abbreviated as "IC" in FIG. 25.

When the electronic control device 500 determines that one of the actuators 100 needs to carry out the initialization procedure, it sets an initialization flag and sends a flag signal to the electrical control circuit 200 of that actuator 100 (S501). The electronic control device 500 also sends a signal to a circuit 200 instructing it to rotate the actuator 100 in a specified initialization direction (S502). Upon receiving such an initialization flag instruction signal, the circuit 200 sets an initialization flag and rotates the actuator 100 in the initialization direction.

After that, if the circuit 200 detects the initialization pattern pulse signals, it sets an initialization pattern detection flag and sends an initialization pattern detection flag signal to the electronic control device 500. It then stops power supply to the actuator 100, thereby completing the initialization procedure. Upon receiving the initialization pattern detection flag signal (S503: Yes), the electronic control device 500 sends signals to the electrical control circuit 200 instructing it to clear both the initialization flag and initialization pattern detection flag, and data regarding the current position of the actuator 100 (S504, S505). In response, the circuit 200 clears the flags, and stores the data on the current position as a reference position.

On the other hand, if the initialization pattern pulse signals have not been detected and the link lever 160 has hit the stopper 5a, the two-phase signal output will have ceased.

In this case, the electronic control device 500 determines that the signal output has ceased based on a lapse of a preset time during which there is no change in the input A-phase and B-phase pulse signals (S506: Yes), and sends a signal to the electrical control circuit 200 instructing it to rotate the actuator 100 in the counter-initialization direction (S507).

In response, the circuit 200 rotates the actuator 100 in the counter-initialization direction. After that, if the circuit 200 detects the initialization pattern pulse signals, then it sets an initialization pattern detection flag and sends an initialization pattern detection flag signal to the electronic control device 500. Upon receiving this initialization pattern detection flag signal (S508: Yes), the electronic control device 500 executes the process steps S504 and S505.

If, when the actuator 100 is rotating in the counter-initialization direction, the electrical control circuit 200 does not detect the initialization pattern pulse signals and the electronic control device 500 detects a discontinuity in the two-phase signal output, then the electronic control device 500 determines that the link lever 160 has hit the stopper 5b and is locked, and that the initialization procedure of the actuator 100 has failed (S509: Yes), and sends a signal to the circuit 200 instructing it to rotate the actuator 100 in the initialization direction by a preset number of pulses (S510). In response, the circuit 200 rotates the actuator 100 in the initialization direction by the preset number of pulses, thereby rotating the link lever 160 a certain angle away from the stopper 5b.

Meanwhile, the electronic control device 500 clears the initialization flag and sends a signal indicative of the resetting of the flag to the electrical control circuit 200 (S511), and sets an initialization failure flag (S512). The electrical control circuit 200 stores this signal, and stops the rotation of the actuator 100 to interrupt the initialization procedure.

According to this embodiment, the electronic control device 500 performs initialization and sends an initialization flag signal to a given electrical control circuit 200, and the electrical control circuit 200 sets an initialization flag. Then, the electrical control circuit 200 performs initialization only when this flag is set, whereby the same effects as those of the fifth embodiment are achieved.

Furthermore, because the link lever 160 is rotated away from the stopper 5b a certain angle when the initialization procedure is interrupted, deflection created in the stopper 5b when the link lever 160 of the actuator 100 has hit it is removed, and deterioration caused by plastic deformation of the stopper 5b is suppressed.

(Seventh Embodiment)

In the previous embodiment the electronic control device 500 sends an initialization flag signal to a given electrical control circuit 200 to instruct it whether or not to perform initialization. With this method, even though the signals are sent in a transmission format between the electronic control device 500 and the circuit 200, additional 1-bit data is required for sending and receiving the initialization flag signal. This makes the structure of built-in control logic of the circuit 200 more complex, as it needs to process this flag signal.

In the seventh embodiment, therefore, the instruction as to whether or not to perform initialization is given using information exchanged between the control device 500 and the circuit 200 in the normal control flow.

In the normal control flow, the electrical control circuit 200 stops the rotation of the actuator 100 when the stored current position matches a preset value and when it detects the initialization pattern pulse signals (A-phase/B-phase: 0/0→1/1→0/0), while it ignores the signals and keeps the actuator 100 rotating when the current position does not match the preset value.

The electronic control device 500 can therefore instruct the circuit 200 whether or not to perform initialization by manipulating the current position data stored in the circuit 200 during initialization and during normal operation. For example, the circuit 200 compares the stored current position and a target position sent from the electronic control device 500, and if there is a discrepancy, it drives the actuator 100, i.e., supplies power to the motor 110 so that the current position matches the target position.

The rotation angle sensor 220 counts the number of two-phase signals output during the drive of the actuator 100, and renews the current position data. The actuator 100 is stopped when the current position matches the target position.

Since the two-phase pulse signals are 2-bit data, they correspond to the last two digits of, for example, 10-bit current position data. If the A-phase and B-phase are both logic zero when the current position is $4d$ (=100b), then they are also both logic zero when the current position is changed to $8d$ (=1000b) by driving the motor 110.

Based on this, the control logic of the electrical control circuit 200 is designed such that the circuit stops the motor 110 and sets an initialization pattern detection flag (=1) when the initialization pattern pulse signals (00-11-00) are detected only when the last two digits of the current position data are 00.

If the last two digits are other than 00, for example, 11, then the circuit 200 does not stop the motor 110 nor set the pattern detection flag even when it detects the initialization pattern pulse signals. Thus it can distinguish when to perform initialization.

At the start of the initialization procedure, the electronic control device 500 sends current position data with the last two digits being 00 to the electrical control circuit 200, so that the circuit 200 stops the motor when it detects the initialization pattern pulse signals. On the other hand, the last two digits of the current position data are set other than the predetermined value 00, for example, 11 (1Bh) during the normal operation (which corresponds to the predetermined value as set forth in claim 33), so that the circuit 200 ignores the initialization pattern pulse signals.

Figures 26, 28, 29:
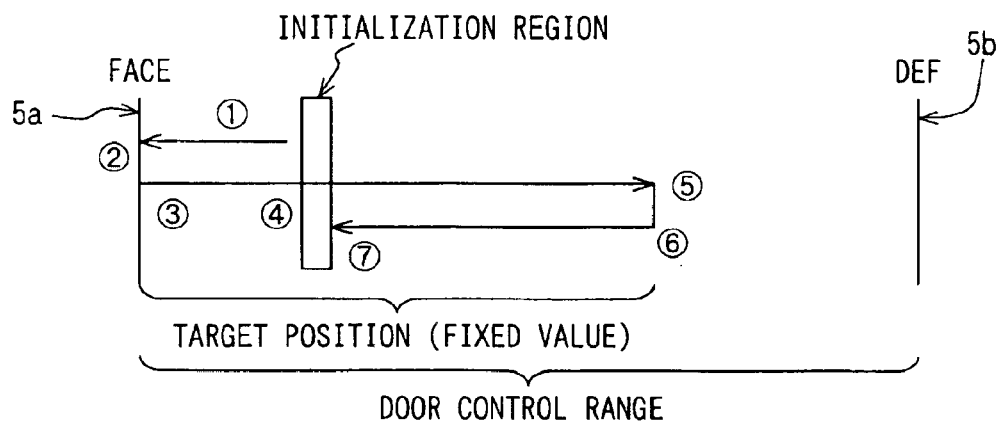
FIG. 26 is a table for explaining the operation of an electronic control unit according to a seventh embodiment.
FIG. 28 is a diagram for explaining the operation of an electronic control unit according to an eighth embodiment of the invention.
FIG. 29 is a table of fail-safe positions in a tenth embodiment of the invention.

The initialization control processing of the electronic control device 500 will be described next in detail with reference to FIG. 26 and FIG. 27. FIG. 26 is a table of characteristics showing examples of current position data and target position data transmitted to the electrical control circuit 200. FIG. 27 is a flowchart of initialization control processing executed by the electronic control device 500.

First, the pulse state of the A-phase and B-phase pulse signals is read out from the electrical control circuit 200 (S521). The electronic control device 500 scans or looks up the characteristics table of FIG. 26 to obtain a current position at the time of detecting the initialization pattern pulse signals, based on the read-out pulse state. The electronic control device 500 then sends this current position data to the electrical control circuit 200 (S522).

The characteristics table of FIG. 26 shows one example in which the current position (8-bit data) value is matched with the target value by subtracting the number of pulses when the actuator 100 is rotated in the initialization direction. The electronic control device 500 then transmits data on a target position (00h) in the initialization direction (S523) to the circuit 200, which in response drives the actuator 100. After that, if the electronic control device 500 receives an initialization pattern detection flag signal from the circuit 200, similarly to the sixth embodiment, it instructs the circuit 200 to clear the initialization pattern detection flag (S525) and sends data on the current position at the time when the initialization pattern pulse signals are detected (S526).

If the circuit 200 does not detect the initialization pattern pulse signals, i.e., if the link lever 160 has hit one of the stoppers 5a, 5b and is locked, then the electronic control device 500 reads out the pulse state of the A-phase and B-phase pulse signals again at the locked position (S528). The electronic control device 500 obtains a current position of the actuator 100 when driven in the counter-initialization direction and a target position based on the read-out pulse state and the characteristics table of FIG. 26 and sends this information to the circuit 200 (S529). Data is also sent on the target position (S530).

The characteristics table of FIG. 26 shows one example in which the current position (8-bit data) value is matched with the target value (FFh) by adding the number of pulses when the actuator 100 is rotated in the counter-initialization direction. After that, if the electronic control device 500 receives an initialization pattern detection flag signal from the circuit 200 (S531: Yes), it instructs the circuit 200 to clear the flag (S525) and sends data on the current position (S526). If the electronic control device 500 does not receive an initialization pattern detection flag signal from the circuit 200 but instead detects a signal indicating that pulse output has stopped (S532: Yes), it reads out the pulse state of the A-phase and B-phase pulse signals again at the locked position (S533).

The electronic control device 500 obtains a current position of the actuator when driven in the initialization direction based on the read-out pulse state and the characteristics table of FIG. 26 and sends this information to the circuit 200 (S534). The electronic control device 500 also sends a signal instructing the circuit 200 to rotate the actuator 100 in the initialization direction by a preset number of pulses (S535). It also sends data on target position to be reached by rotating the actuator 100 by the preset number of pulses, and sets an initialization failure flag (=1) (S536).

In response, the circuit 200 rotates the actuator 100 in the initialization direction by a preset number of pulses, and stores the data on the current position and target position sent from the electronic control device 500.

(Eighth Embodiment)

In the previous embodiment, at the start of the initialization procedure, the A-phase and B-phase pulse state is first read out, based on which the current position at the time of detecting the initialization pattern pulse signals is determined, by referencing the table of FIG. 26. This determination of the current position is made on condition that the motor 110 is stopped.

If, as shown in FIG. 23B, the link lever 160 of the actuator hits the stopper 5a and is locked without detecting the initialization pattern pulse signals even when the motor 110 is driven, the circuit 200 could read out the pulse state at this locked position, based on which it determines the current position and rotates the motor in its reverse direction. In the locked state, however, the deflection in the stopper 5a (lock means) creates a reaction force when the lock is released (motor is stopped), whereby the rotating shaft of the motor 110 is turned in its reverse direction.

That is, the electrical control circuit 200 cannot determine the current position at the locked position (which corresponds to a current position at the time of detecting the initialization pattern pulse signals) because of this instability of the motor 110. If the current position is determined in this state, there may be a discrepancy between this position and the actual position of the motor, i.e., the last two digits of the position information would be other than "00", in which case the motor would be stopped when it is reversed to the initialization region 301 because the initialization pattern pulse signals are not detected.

Therefore, when turning the motor in its reverse direction after it is locked by the stopper 5a, as shown in FIG. 28, the electrical control circuit 200 sets a target position that is farther than the initialization region 301 where the initialization pattern pulse signals are to be detected, and turns the motor by the preset number of pulses to reach the target position. The motor is stopped at the target position before it hits the stopper 5b, and starts the initialization procedure from there.

The electronic control device 500 reads out the pulse state of the A-phase and B-phase pulse signals from the circuit 200 and references the table of FIG. 26 to determine the current position at the time of detecting the initialization pattern pulse signals based on the pulse state, and sends the current position information to the circuit 200. The electronic control device 500 and the circuit 200 then carry out the processing as described in the seventh embodiment.

(Ninth Embodiment)

In the above-described fifth to eighth embodiments, the initialization direction is predetermined, i.e., in the example of FIG. 23B, when the actuator 100 is at a halt near the face blowing opening door (stopper 5a), the direction towards the stopper 5a is determined to be the initialization direction. This means that the actuator 100 is always locked by the stopper 5a every time when the initialization is performed, and frequent repetition of the initialization may lead to breakage of the motor 110 or stopper 5a.

Therefore, in the example of FIG. 23B, the direction toward the defroster door (stopper 5b) is determined to be the initialization direction to avoid frequent lock during a hot season in which the face mode is most likely to be preset. As for the case where the air mix door 1 is driven by the actuator 100, when the initialization region 301 is located at the midpoint between the COOL side (for blowing cooled air) and HOT side (for blowing hot air) of the door control range, the initialization direction is set in accordance with the season. For example, it is set to be towards the HOT side during summer, and towards the COOL side during winter.

Thereby, unnecessary locking after the start of initialization is avoided, and the time for the initialization is shortened. The current season can be determined by the CPU of the electrical control circuit 200 based on the temperature obtained by an inside air temperature sensor. The outside air temperature may of course be used for the determination of the season, or both the inside air and outside air temperatures may be used.

(Tenth Embodiment)

In the above-described fifth to ninth embodiments, how the control device detects or ignores the initialization pattern pulse signals has been described. However, there may be cases where a desired pulse output cannot be obtained because of mechanical contact failure caused by wear of contact brushes 155–157 or pattern plate 153, chattering, or entry of foreign matter. Also, because of electrical noise, there may be cases where the initialization pattern pulse signals are not detected because of an error in the communication data exchanged between the electronic control device 500 and the circuits 200, as with the sixth or seventh embodiment.

In such cases, the motor 110 is repeatedly started and stopped at the time of the initialization procedure until the initialization pattern pulse signals are detected, which may lead to breakage of stoppers 5a, 5b because of repeated locking, and to battery voltage decline due to increased current consumption. That is, the motor 110 must be stopped if the initialization pattern pulse signals are not detected after it has passed the initialization region 301 a preset number of times.

This control can be made by the electronic control device 500 and circuit 200 in the following manner:

The electronic control device 500 instructs the circuit 200 of each actuator 100 to reverse the rotation of the motor 110 every time the motor is locked by one of the stoppers 5a, 5b, based on the judgment that the initialization pattern pulse signals have not been detected. Here, if the number of times of rotating the motor in reverse direction exceeds a preset value, the control device 500 determines that there has been a signal detection failure, and stops the motor 110.

In this case, the motor is controlled to stop at a "fail-safe position" so as to avoid troubles that can cause a safety hazard, such as failure in the defrosting or hot air blowing function. FIG. 29 shows respective fail-safe positions for the air mix door, blowing opening door, air inlet door, and cooling air bypass door.

Figure 23C:
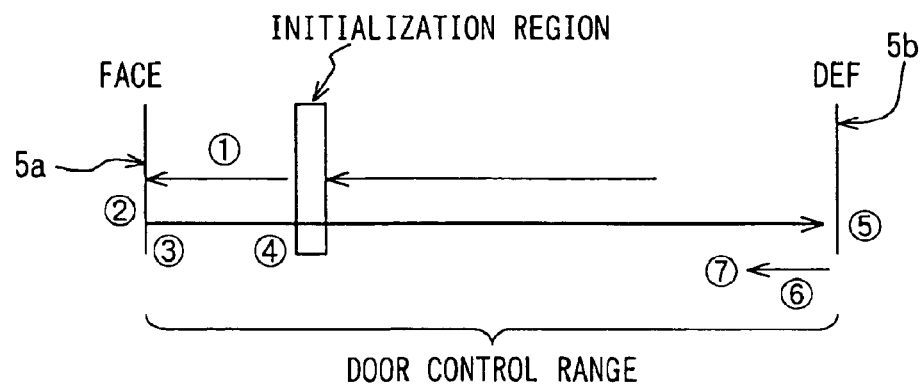
FIG. 23C is a diagram for explaining the operation of the electric actuator according to the fifth embodiment.

Preferably, the permissible number of times of turning the motor in reverse direction is set to be twice so that the actuator passes the initialization region 301 twice as in the example of FIG. 23C. For example, with the number being set as three, if the motor 110 is locked by one of the stoppers 5a, 5b and turned in reverse (reverse rotation means), and likewise locked by the other stopper and turned reversely two more times, then it is determined that there has been a signal detection failure, and the motor 110 is stopped at the fail-safe position (fail-safe means). This control is particularly effective where there is a detection failure caused by temporary noise in the pulse signals.

(Other Embodiments)

Figure 30:
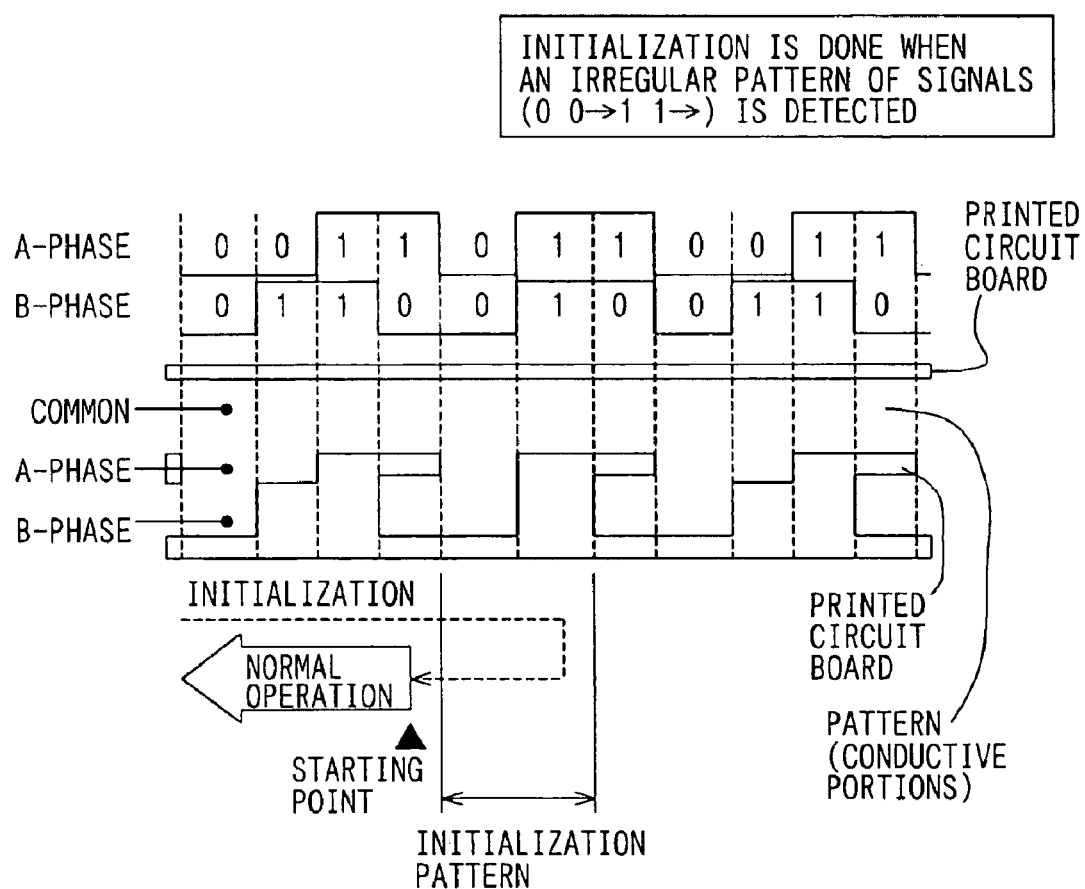
FIG. 30 is a chart illustrating another example of the initialization pattern.

The initialization pattern used in the above embodiments includes simultaneous changes of the two-phase pulse signals from a low level to a high level and then to a low level ("00"→"11"→"00"), but this pattern may be reversed, i.e., the signals may switch from a high level to a low level and then to a high level ("11"→"00"→"11"). Alternatively, the initialization pattern may include only one simultaneous change of the signals from a low level to a high level ("00"→"11") as shown in FIG. 30. Such signals can be output by causing the first and second contact brushes 155, 156 to make contact with the conductive portions 151a, 152a (ON) simultaneously, then with the non-conductive portions 151b, 152b (OFF), while the third contact brush 157 remains in contact with the conductive portion 154a.

Alternatively, the initialization pattern may be a simultaneous change of two-phase signals from a high level to a low level ("11"→"00"). In short, the initialization pattern may take any form as long as it differs from the pattern for detecting the rotation angle of the motor 110, for example, "01"→"10"→"01," "11"→"00"→"11," or "10"→"01"→"10," where "01" means a state in which the A-phase is a low level and the B-phase a high level, "00" means a state in which both phases are a low level, "11" means a state in which both phases are a high level, and "10" means a state in which the A-phase is a high level and the B-phase a low level.

In the above embodiments, when power supply to the motor 110 is stopped, the position where the rotation of the motor has been electrically stopped is stored as a starting point, after which the motor is controlled using a reference point that is offset from this starting point. The invention is not to be limited to such control; for example, the starting point itself may be used as the reference point.

In the above embodiments, the position sensor is a sliding contact type, but the present invention is not limited thereto since other types of position sensors such as optical encoders may also be used. The pulse generator 158 is mounted to the output shaft 127 in the above embodiments, but the present invention is not limited thereto, since it may be mounted on an additional rotating part of reduced speed.

The common pattern 154 is arranged on the inner side of the other pulse patterns 151, 152 in the above embodiments, but it may be located on the outer side or between the pulse patterns 151, 152.

The control device determines that the initialization pattern pulse signals have not been detected when the motor 110 is locked by one of the stoppers 5a, 5b in the above embodiments. Such determination may be made based on a preset rotation angle of the motor 110, i.e., the motor may be reversed if the signals are not detected even after turning it more than the preset rotation angle.

In the tenth embodiment where the electronic control device 500 controls a plurality of electrical control circuits 200, the electronic control device 500 instructs the circuit 200 to stop the motor 110 when the number of reverse rotations of the motor exceeds a preset value. Alternatively, this determination as to whether there has been a failure in detecting the initialization pattern pulse signals may be made by the circuit 200 itself, as in the arrangement of FIG. 7, during its control of the actuator 100.

Although the invention is applied to a vehicle air conditioning system in the above embodiments, it is not to be limited to such an application. Therefore, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric actuator system comprising:
   an electric motor;
   a pulse generator for generating pulse signals in accordance with rotation of said electric motor; and
   means for detecting a rotation angle of a rotating shaft based on the pulse signals generated by said pulse generator, wherein
   said pulse generator generates initialization pattern pulse signals as the electric motor rotates, said signals indicative of a starting point of the rotation of said electric motor, and
   means for electrically controlling the rotation of said electric motor when said initialization pattern pulse signals are detected.

2. The electric actuator system according to claim 1, wherein said initialization pattern has a combination of waveforms that are different from that of a signal pattern that said rotation angle detecting means uses for detecting the rotation angle.

3. The electric actuator system according to claim 1, wherein said pulse generator generates two-phase pulse signals as the initialization pattern pulse signals and said initialization pattern includes a simultaneous change of amplitude of said two-phase pulse signals.

4. The electric actuator system according to claim 3, wherein said initialization pattern includes two or more simultaneous changes of the amplitude of said two-phase pulse signals.

5. The electric actuator system according to claim 3, said pulse generator further comprising:
   means for first and second switching connected in parallel between a power source circuit and ground, said first and second switching means being individually turned on and off as the electric motor rotates, thereby generating said two-phase pulse signals.

6. The electric actuator system according to claim 5, said pulse generator further comprising:
   means for common switching connected between said first and second switching means and ground.

7. The electric actuator system according to claim 6, wherein said pulse generator is configured such that said common switching means is turned on and off while said first and second switching means are maintained in an ON state, thereby generating said two-phase pulse signals from said first and second switching means.

8. The electric actuator system according to claim 3, wherein said initialization pattern undergoes a simultaneous change of the amplitude of said two-phase pulse signals from a low level to a high level, and to the low level.

9. An electric actuator system comprising:
an electric motor;
a pulse generator for generating pulse signals in accordance with a rotation angle of said electric motor; and
means for detecting a rotation angle of a rotating shaft based on the pulse signals generated by said pulse generator, wherein
said pulse generator generates initialization pattern pulse signals as the electric motor rotates, said signals indicative of a starting point of the rotation of said electric motor, the system further comprising:
means for setting and storing an initial position, at which said initialization pattern pulse signals are detected, as a starting point, and
means for initial position re-setting and operating said initial position setting means when there is an abnormality in the pulse signals generated in accordance with the rotation angle of said electric motor.

10. The electric actuator system according to claim 9, wherein said initial position re-setting means determines that there is an abnormality in the pulse signals when there is irregularity in the waveform of said pulse signals.

11. The electric actuator system according to claim 9, wherein said initial position re-setting means determines that there is an abnormality in the pulse signals when the pulse signals stop changing while power is supplied to said electric motor.

12. The electric actuator system according to claim 11, wherein said initial position re-setting means determines whether there is an abnormality in the pulse signals after a lapse of a preset time period after the start of power supply to said electric motor.

13. The electric actuator system according to claim 11, wherein said initial position re-setting means operates said initial position setting means after starting power supply to rotate said electric motor in an opposite direction from a direction in which said electric motor is rotating immediately before the pulse signals stop changing.

14. The electric actuator system according to claim 11, wherein said initial position re-setting means operates said initial position re-setting means operates said initial position setting means after starting power supply to rotate said electric motor in an opposite direction from a direction toward said starting point.

15. The electric actuator system according to claim 9, wherein, when there is an abnormality in the pulse signals, said initial position re-setting means operates said initial position setting means after a lapse of a preset time period after a startup switch that allows power supply to said electric motor is turned off.

16. The electric actuator system according to claim 9, wherein, when there is an abnormality in the pulse signals, said initial position re-setting means operates said initial position setting means immediately after a startup switch that allows power supply to said electric motor is turned off.

17. The electric actuator system according to claim 9, wherein, when there is an abnormality in the pulse signals, said initial position re-setting means operates said initial position setting means immediately after occurrence of the abnormality.

18. An electric actuator system comprising:
an electric motor;
a battery power source for supplying power to said electric motor;
a pulse generator for generating pulse signals in accordance with a rotation angle of said electric motor; and
means for detecting a rotation angle of a rotating shaft based on the pulse signals generated by said pulse generator, wherein
said pulse generator generates initialization pattern pulse signals as the electric motor rotates, said signals indicative of a starting point of rotation of said electric motor, the system further comprising:
means for setting an initial position and storing a position, at which said initialization pattern pulse signals are detected, as a starting point;
a startup switch that allows power supply to said electric motor;
a memory device that can retain input information without power supply; and
means for inputting data in said memory device after said startup switch is turned off, said data indicates that the battery is connected.

19. The electric actuator system according to claim 18, wherein said memory device is an EEPROM that is rewritable with electrical processing.

20. The electric actuator system according to claim 18, further including:
means for resetting said data input to said memory device after the startup switch is turned on.

21. The electric actuator system according to claim 18, wherein said initial position setting means is operated when said data is not present in said memory device after said startup switch is turned on.

22. An electric actuator system comprising:
an electric motor for rotating movable parts;
a pulse generator for generating pulse signals in accordance with rotation of said electric motor; and
means for controlling a rotation angle of a rotating shaft based on the pulse signals generated by said pulse generator, wherein
said pulse generator generates initialization pattern pulse signals as the electric motor rotates within a rotation control range of said movable parts, said signals indicative of a starting point of the rotation of said electric motor, the system further comprising:
means for selling an initial position and stopping said electric motor when said initialization pattern pulse signals are detected and storing a stopped position of the electric motor as a starting point, wherein
said control means maintains rotation of said electric motor during its control of the rotation angle even when said initialization pattern pulse signals are detected.

23. The electric actuator system according to claim 22, further comprising:
means for setting flag data when it is determined to be necessary to store said starting point, wherein, when said flag data is set, if the initialization pattern pulse signals are detected, said initial position setting means stops the rotation of the electric motor and stores the stopped position of the electric motor as the starting point, and when the flag data is cleared, said control means ignores said initialization pattern pulse signals and keeps said electric motor rotating.

24. The electric actuator system according to claim 22, wherein said electric motor is rotated by said initial position setting means in a direction that is determined based on detection possibility of said initialization pattern pulse signals.

25. The electric actuator system according to claim 22, wherein said electric motor is rotated by said initial position setting means in a direction that is determined based on mechanical strength at both ends of a rotation control range.

26. The electric actuator system according to claim 22, wherein said initial position setting means determines a current season and decides in which direction to move said electric motor based on the determined season.

27. The electric actuator system according to claim 26, further comprising:
an inside air temperature sensor for detecting an inside air temperature, wherein said initial position setting means determines the season based on a detected inside air temperature.

28. The electric actuator system according to claim 26, further comprising:
an outside air temperature sensor for detecting an outside air temperature, wherein said initial position setting means determines the season based on a detected outside air temperature.

29. The electric actuator system according to claim 28, further comprising:
an inside air temperature sensor for detecting an interior air temperature, wherein said initial position setting means determines the season based on a detected interior air temperature and a detected outside air temperature.

30. An electric system comprising:
an electric motor;
a pulse generator for generating pulse signals in accordance with rotation of said electric motor and initialization pattern pulse signals indicative of a starting point of the rotation of said electric motor;
a control unit for controlling a rotation angle of a rotating shaft based on the pulse signals generated by said pulse generator;
initial position setting means for stopping said electric motor, when said initialization pattern pulse signals are detected, and storing the stopped position of the electric motor as a starting point; and
means for stopping rotation of said electric motor at a fail-safe position when it is determined that there has been a failure in detecting said initialization pattern pulse signals.

31. The electric actuator system according to claim 30, said fail-safe means further comprising:
means for turning said electric motor in a reverse direction when it determines, based on the pulse signals from said pulse generator, that said initialization pattern pulse signals are not detected during the rotation of said electric motor by said initial position setting means, and wherein said fail-safe means determines that there is a failure in detecting said initialization pattern pulse signals when the rotation of said electric motor is reversed more than a preset number of times.

32. An electric actuator system comprising:
a plurality of electric actuators each including an electric motor for rotating movable parts;
a pulse generator for generating pulse signals in accordance with rotation of said electric motor and initialization pattern pulse signals indicative of a starting point of the rotation of said electric motor within a rotation control range of said movable parts;
a plurality of electrical control circuits each including:
means for controlling a rotation angle of a rotating shaft of each electric actuator based on the pulse signals generated by said pulse generator; and
means for setting an initial position and for stopping said electric motor, when said initialization pattern pulse signals are detected, and storing the stopped position of the electric motor as a starting point; and
an electronic control device that communicates with said plurality of electrical control circuits, wherein
said electronic control device sends flag data to the electrical control circuit of each of said electric actuators for instructing whether to operate said initial position setting means, and
when said electrical control circuit has received preset flag data from said electronic control device, the control unit of said electrical control circuit keeps said electric motor rotating and continues the control of the rotation angle of the electric motor even if said initialization pattern pulse signals are detected.

33. An electric actuator system comprising:
a plurality of electric actuators each including an electric motor for rotating movable parts, and a pulse generator for generating pulse signals in accordance with rotation of said electric motor and initialization pattern pulse signals indicative of a starting point of the rotation of said electric motor within a rotation control range of said movable parts;
a plurality of electrical control circuits each including control means for controlling rotation angle of a rotating shaft of each electric actuator based on the pulse signals generated by said pulse generator, and initial position setting means for stopping said electric motor, when said initialization pattern pulse signals are detected, and storing the stopped position of the electric motor as a starting point; and
an electronic control device that communicates with said plurality of electrical control circuits, wherein
said electronic control device sends current position data of each electric actuator to each electrical control circuit, and
each of said plurality of electrical control circuits receives the current position data and renews the received current position data based on the pulse signals generated from said pulse generator, and operates said initial position setting means to stop the rotation of said electric motor and to store the stopped position of the electric motor as the starting point only when the renewed current position data matches a predetermined value and said initialization pattern pulse signals are detected.

34. The electric actuator system according to claim 33, each of said plurality of electric actuators comprising:
means for mechanically stopping the rotation of said electric motor at both ends of said rotation control range;
means for turning said electric motor in a reverse direction when the rotation of the electric motor is stopped by a first of said stop means before the detection of said initialization pattern pulse signals by said initial position setting means, and
means for stopping reverse rotation of said electric motor, during the rotation of the electric motor in the reverse direction by said reverse rotation means, at a position farther than a position where said initialization pattern pulse signals are to be detected before the electric motor is stopped by a second of said stop means and for receiving current position data from said electronic control device at the stopped position, and when said reverse rotation means rotates said electric motor in the reverse direction after said receiving means receives the current position data, if the renewed current position data matches a predetermined value and if said initialization pattern pulse signals are detected, said initial position setting means stops the rotation of said electric motor and stores the stopped position as a starting point.

35. An electric actuator system comprising:

a plurality of electric actuators each including an electric motor for rotating movable parts, and a pulse generator for generating pulse signals in accordance with rotation of said electric motor and initialization pattern pulse signals indicative of a starting point of the rotation of said electric motor within a rotation control range of said movable parts;

a plurality of electrical control circuits each including:

means for controlling a rotation angle of a rotating shaft of each electric actuator based on the pulse signals generated by said pulse generator;

means for initially setting and stopping said electric motor when said initialization pattern pulse signals are detected and storing the stopped position of the electric motor as a starting point; and an electronic control device that communicates with said plurality of electrical control circuits, wherein when said electronic control device determines that there is a failure in detecting said initialization pattern pulse signals in each electric actuator, it instructs said electrical control circuit of each electric actuator to stop the rotation of said electric motor so that the electric actuator stops at a fail-safe position.

36. The electric actuator system according to claim 35, said electronic control device further comprising:

means for reversing rotation of said electric motor of said electric actuator when it determines, based on the pulse signals from said pulse generator, that said initialization pattern pulse signals are not detected during the rotation of said electric motor by said initial position setting means, wherein said electronic control device determines that there is a failure in detecting said initialization pattern pulse signals in said electric actuator when the rotation of said electric motor is reversed more than a preset number of times.

* * * * *